(12) United States Patent
Hainfellner et al.

(10) Patent No.: US 12,085,828 B2
(45) Date of Patent: Sep. 10, 2024

(54) LIQUID CRYSTAL WINDOW BONDING AND SEALING

(71) Applicant: Wicue, Inc., Cupertino, CA (US)

(72) Inventors: Martin Hainfellner, Münich (DE); Fenghua Li, Cupertino, CA (US)

(73) Assignee: WICUE USA INC.

( * ) Notice: Subject to any disclaimer, the term of this patent is extended or adjusted under 35 U.S.C. 154(b) by 86 days.

(21) Appl. No.: 17/848,129

(22) Filed: Jun. 23, 2022

(65) Prior Publication Data

US 2022/0413330 A1 Dec. 29, 2022

Related U.S. Application Data

(60) Provisional application No. 63/215,307, filed on Jun. 25, 2021.

(51) Int. Cl.
*G02F 1/139* (2006.01)
*B32B 3/08* (2006.01)
(Continued)

(52) U.S. Cl.
CPC .............. *G02F 1/1396* (2013.01); *B32B 3/08* (2013.01); *B32B 7/12* (2013.01); *B32B 17/10036* (2013.01); *B32B 17/10302* (2013.01); *B32B 17/10339* (2013.01); *B32B 17/10458* (2013.01); *B32B 17/10504* (2013.01);
(Continued)

(58) Field of Classification Search
CPC .............. G02F 1/1396; G02F 1/133308; G02F 1/1339; B32B 3/08; B32B 7/12; B32B 17/10036; B32B 17/10302; B32B 17/10339; B32B 17/10458; B32B 17/10504; B32B 17/10761; B32B 2305/55; B32B 2307/402; B32B 2307/416; B32B 2307/42; B32B 2307/732; B32B 2315/08; B32B 2329/06; B32B 2367/00; B32B 2419/00; B32B 2457/202; B32B 2605/006; B32B 2605/08; B32B 2605/12; B32B 2605/18
See application file for complete search history.

(56) References Cited

U.S. PATENT DOCUMENTS

2021/0103174 A1* 4/2021 Ishii .................. B32B 17/10761
2021/0132434 A1* 5/2021 Hyodo .................. G02F 1/1335
(Continued)

FOREIGN PATENT DOCUMENTS

CN 112967607 A 6/2021

OTHER PUBLICATIONS

European Search Report in European application No. 22181118.5, mailed on Nov. 11, 2022.

*Primary Examiner* — Nathanael R Briggs
(74) *Attorney, Agent, or Firm* — PV IP PC; Wei Te Chung; Zhigang Ma

(57) ABSTRACT

Described herein are liquid crystal (LC) assemblies that are dimmable and techniques for manufacturing LC assemblies. In one example, an LC assembly comprises: a first curved glass panel, a second curved glass panel, and a liquid crystal panel having a first outer surface and a second outer surface, a layer of a liquid adhesive attaching the first curved glass panel and the first outer surface of the liquid crystal panel, and a film adhesive attaching the second curved glass panel and the second outer surface of the liquid crystal panel.

21 Claims, 24 Drawing Sheets

(51) Int. Cl.
  *B32B 7/12* (2006.01)
  *B32B 17/10* (2006.01)
  *G02F 1/1333* (2006.01)
  *G02F 1/1339* (2006.01)
  *G02F 1/137* (2006.01)

(52) U.S. Cl.
  CPC .. *B32B 17/10761* (2013.01); *G02F 1/133308* (2013.01); *G02F 1/1339* (2013.01); *G02F 1/13725* (2013.01); *B32B 2305/55* (2013.01); *B32B 2307/402* (2013.01); *B32B 2307/416* (2013.01); *B32B 2307/42* (2013.01); *B32B 2307/732* (2013.01); *B32B 2315/08* (2013.01); *B32B 2329/06* (2013.01); *B32B 2367/00* (2013.01); *B32B 2419/00* (2013.01); *B32B 2457/202* (2013.01); *B32B 2605/006* (2013.01); *B32B 2605/08* (2013.01); *B32B 2605/12* (2013.01); *B32B 2605/18* (2013.01); *G02F 2201/56* (2013.01); *G02F 2202/28* (2013.01); *G02F 2203/48* (2013.01)

(56) References Cited

U.S. PATENT DOCUMENTS

2021/0138767 A1* 5/2021 Mannheim Astete ....................... B32B 17/10889
2022/0347975 A1* 11/2022 Mannheim Astete ....................... G02F 1/0107
2023/0226813 A1* 7/2023 Labrot ................. B32B 27/306
  349/158

* cited by examiner

FIG. 2A  FIG. 2B

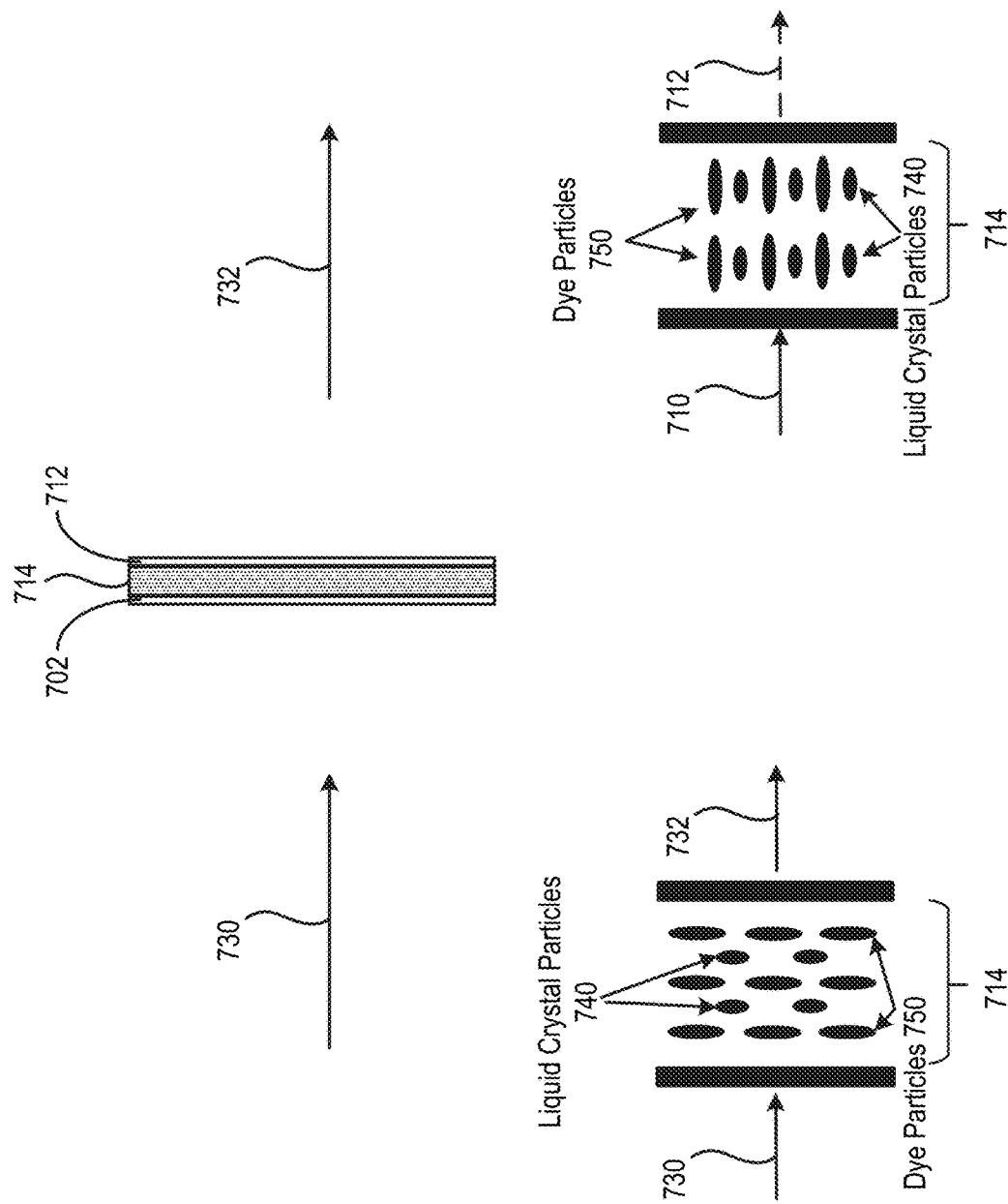

LIQUID CRYSTAL WINDOW BONDING AND SEALING

CROSS-REFERENCE TO RELATED APPLICATIONS

This application claims the benefit of U.S. Provisional Application No. 63/215,307, filed Jun. 25, 2021, entitled "LIQUID CRYSTAL WINDOW BONDING AND SEALING" which is incorporated herein by reference in its entirety.

BACKGROUND

The present disclosure relates generally to a liquid crystal assembly and, more specifically, to various structures incorporating a liquid crystal cell and methods for producing such structures. The present disclosure also relates to a liquid crystal assembly that is dimmable through electrically adjusting the light transmittance of one or more liquid crystal cells in the liquid crystal assembly.

BRIEF SUMMARY

The present disclosure relates to a liquid crystal (LC) assembly that includes one or more liquid crystal cells. In some embodiments, an LC assembly is electrically controllable to vary the light transmittance of the LC assembly. In embodiments featuring an LC assembly with multiple cells, each cell may correspond to a different segment along a surface of the LC assembly, and the cell may be individually controlled to vary the transmittance of that segment without affecting the transmittance of other segments. The dimmable LC assemblies disclosed herein can be used in a variety of settings, including vehicular settings (e.g., a car window) and architectural settings (e.g., a window of a building).

The structure of an LC assembly may depend on the setting and the application in which the LC assembly is to be used. For instance, LC assemblies used in a vehicular setting may include flexible materials for impact resistance and/or adhesive materials for protection against separation into many pieces (fragmentation) in the event of breakage. For instance, an LC assembly used in a vehicular setting should preferably behave like a safety glass having multiple layers, where the multiple layers are capable of breaking into smaller pieces with the pieces remaining adhered to an adhesive layer or substrate of the LC assembly. Further, an LC assembly including one or more flexible layers (e.g., a flexible substrate) may be easier to install and more tolerable to physical manipulation such as bending. Further, since optical clarity is important in a vehicular setting, a dimmable LC assembly may provide for variable transmittance with minimal haze or scattering of light. This would allow a user to see clearly through the LC assembly regardless of how the light transmittance is changed.

The present disclosure also relates to techniques for producing liquid crystal assemblies using a manufacturing process that involves laminating together layers of different material. In some embodiments, techniques are applied to incorporate a curved layer (e.g., a glass panel) into an LC assembly. This would enable the LC assembly to be formed into a shape suitable for use as a window in a vehicle or in any other application that might require a curved LC assembly.

In some embodiments, a dimmable LC assembly may be controlled based on one or more sensors configured to collect data about the environment around the LC assembly, e.g., optical and/or temperature sensors. The sensor data can be processed to automatically perform dimming in response to changes in the environment, such as variations in the location or the brightness of a light source in the environment.

In some embodiments, techniques are applied to laminate an LC assembly at a lower temperature and/or pressure than would typically be used. In particular, an LC assembly suitable for use in a vehicular setting may include one or more polyvinyl butyral (PVB) layers. Lamination of PVB typically involves temperatures and pressures that are above those which components of an LC assembly can withstand. For instance, spacers separating opposing substrates that define the walls of an LC cell are prone to deformation and/or dislocation in the presence of heat. High temperature can also create defects in the LC cell itself, such as dark spots. Accordingly, in some embodiments, the temperature and/or pressure is lowered by performing lamination in a vacuum environment.

In some embodiments, techniques are applied to laminate an LC assembly including one or more ultraviolet (UV) blocking layers. Due to the presence of the one or more UV blocking layers, UV curing of adhesives may not be available as a method of joining together two or more components, for instance, gluing a spacer or gasket to a substrate. The inclusion of a UV blocking layer can be for any number of reasons. For instance, to form a twisted nematic (TN) liquid crystal display, polarizers are added on opposing sides of an LC cell or introduced as part of the LC cell itself. A polarizer can include a polarizer plate plus a protective coating designed to protect the polarizer plate against damage. This protective coating may be formed of a material that blocks UV light (e.g., cellulose triacetate (TAC)) to the extent that any UV light that is able to pass through the polarizer is insufficient to fully cure a UV adhesive. Accordingly, in some embodiments, non-UV adhesives are used and may include, for example, an epoxy adhesive or a heat-activated adhesive. Such alternative adhesives may introduce additional challenges that are not present when using a UV adhesive. For instance, epoxy adhesives have limited working time before the adhesive sets, so the time window within which parts to be joined can be repositioned (e.g., to correct a misalignment) may be brief. Further, as indicated above, introducing heat may damage components that are sensitive to high temperature, such as spacers within an LC cell or the LC cell itself.

As indicated above, in some embodiments, LC assemblies may include one or more flexible layers. LC assemblies described herein may include rigid and/or flexible substrates. In particular, a substrate can be formed as a flexible film (e.g., a layer of flexible material having a thickness of approximately 200 μm or less) that includes a coating of electrically conductive material. Flexible substrates can include TAC (triacetate), polycarbonate (PC), polyethylene terephthalate (PET), or other flexible material. Flexible substrates can be used to construct flexible LC assemblies. For example, an LC assembly can be formed which is devoid of glass or other rigid substrates and of sufficient thinness to allow the overall LC assembly to be a flexible film. If an LC assembly is formed using rigid substrates (e.g., an LC cell including or encased between glass panels), such an assembly can be used as a standalone window. Alternatively, some embodiments feature a flexible substrate that permits the LC assembly to be applied as an add-on to a window or other ready-made rigid surface (e.g., as a thin film and using a clear, water-based or solvent-based adhesive). A flexible LC assembly is advantageous when the surface to which the LC assembly is being applied is a curved surface, since the LC assembly would be able to conform to the curvature of the surface and thereby eliminate or at least substantially minimize the presence of air bubbles or gaps between the LC assembly and the surface.

Techniques described herein for manufacturing an LC assembly can be implemented using a computer system with one or more processing units (e.g., general purpose processors) that can be configured to perform particular operations or actions (e.g., controlling temperature and/or pressure) by virtue of having access to software, firmware, hardware, or a combination of them installed on the system. One or more computer programs can be configured to perform particular operations or actions by virtue of including instructions are executable by the one or more processing units. The one or more computer programs can be stored on non-transitory computer readable media (e.g., computer storage devices that form memory) accessible to the one or more processing units.

BRIEF DESCRIPTION OF THE DRAWINGS

FIGS. 2A to 2C show examples of ways in which a dimmable LC assembly can be segmented.

FIGS. 7A to 7C illustrate examples of liquid crystal cells that can be used to form an LC assembly according to one or more embodiments.

Figure 1:
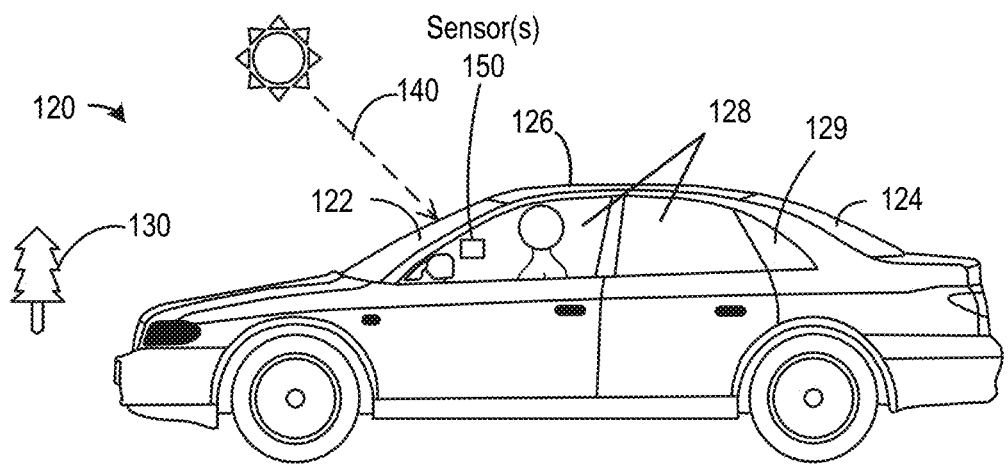
FIG. 1 illustrates an example of an environment in which an LC assembly can be used.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

The present disclosure relates to a liquid crystal (LC) assembly that includes one or more liquid crystal cells. In some embodiments, an LC assembly is electrically controllable to vary the light transmittance of the LC assembly, i.e., dimmable. In embodiments featuring an LC assembly with multiple cells, each cell may correspond to a different segment along a surface of the LC assembly, and the cell may be individually controlled to vary the transmittance of that segment without affecting the transmittance of other segments. The dimmable LC assemblies disclosed herein can be used in a variety of settings, including vehicular settings (e.g., a car window) and architectural settings (e.g., a window of a building).

As used herein, the term "dimmable" refers to the ability to vary light transmittance up or down by means of one or more control signals. For instance, an LC cell may include a pair of electrodes on opposite sides of the liquid crystal layer, where a voltage applied across the electrodes causes the liquid crystal particles (e.g., individual liquid crystal molecules) to align in such a way that the LC cell is darkened by reducing the amount of light that is able to pass through the LC cell. There are various types of dimmable LC cells, including twisted nematic (TN), Guest-Host (GH), vertical alignment (VA), and others. Dimmable LC cells can be configured so that the light transmittance is highest when the value of the control signal is at its lowest (e.g., zero volts). Such cells are sometimes referred to as being "normally-white" (NW). Alternatively, dimmable LC cells can be configured so that the light transmittance is lowest when the value of the control signal is at its lowest.

Embodiments of the present disclosure can be used to implement LCD displays, including LCD displays that are dimmable. Although LCD display structures are not specifically discussed, it will be understood that an LCD assembly described herein can be adapted to form an LCD display through, for example, the addition of a mono-color or multi-color (e.g., red-green-blue) backlight.

Some embodiments of the present disclosure relate to a window or LC assembly that is curved, meaning that a surface of the window or LC assembly has a three-dimensional curvature (e.g., convex toward the exterior environment) instead of being flat.

The present disclosure also relates to techniques for manufacturing LC assemblies, including LC assemblies that are dimmable by electrically controlling the light transmittance of one or more LC cells in the LC assembly. Some embodiments are directed to dimmable assemblies that can be used as or incorporated into windows. In general, a window is any substantially rigid structure through which light can be transmitted. In the case of a dimmable window, the degree to which light can be transmitted through the window is controllable within a range of transmittance values. A window can be curved or flat, can have any number of shapes (rectangular, triangular, circular, etc.), and can be enclosed within a frame or be frameless. Additionally, one important aspect of windows that are intended for viewing is optical clarity, e.g., lack of haze/cloudiness, dark spots, or visual distortion.

In order to make an LC assembly, in particular a dimmable LC assembly, suitable for use as or in a window in a safety critical environment, specific types of materials and methods for combining such materials with other components of an LC assembly to form a laminated structure are described herein. An example of a safety critical environment is an automobile, shown in FIG. 1. Other types of environments that can benefit from an LC assembly according to an embodiment described herein include, for example, aircrafts (e.g., airplanes), spacecrafts, watercrafts (e.g., boats), public or commercial vehicles (e.g., trucks or passenger buses), or other vehicles, and architectural environments. For instance, an LC assembly can be used for a window of a building, a glass wall, or a door of a building.

FIG. 1 illustrates an example of an environment in which an LC assembly can be used. As depicted in FIG. 1, an automobile 120 can include a front windshield (also known as a windscreen) 122, a rear windshield 124, a sunroof 126, and side windows 128. In the example of FIG. 1, automobile 120 further includes a quarter glass window 129. Quarter glass windows are generally smaller than the side windows of an automobile and are usually located above a rear wheel or next to a side-view mirror. Due to its location relative to the body of the automobile, a quarter glass window is usually substantially triangular. In general, each of the windows 122, 124, 126, 128, and 129 is curved, with the degree of curvature varying across windows. In the example of FIG. 1, an LC assembly can form or be retrofitted onto any of the windows 122, 124, 126, 128, and 129. The automobile 120 can also include one or more sensors 150 which, as discussed below, can be used to control the dimming of an LC assembly in the automobile 120.

Vehicles can move between different lighting situations rapidly, for example, going from an open road that is well lit by sunlight to a darkened tunnel. Because the lighting situation is subject to change, it can be beneficial to make at least some of the windows 122, 124, 126, 128, or 129 dimmable. For instance, making the front windshield 122 dimmable could increase the comfort of the driver, and therefore driving safety, if the dimming of the front windshield 122 were controlled to reduce light transmittance when the ambient environment is relatively bright and/or to increase light transmittance when the ambient environment is relatively dark. Dimming can be performed to, for example, prevent the driver from being blinded or dazzled when the intensity of the ambient light is above a threshold (e.g., when the front windshield 122 or a portion of the front windshield 122 that is near the driver receives direct sunlight) or when transitioning to a brighter environment after the driver's eyes have become dark-adapted from being in a darker environment for a threshold period of time.

Dimming can be controlled in other ways to enhance safety and/or comfort for a driver or passenger of an automobile. For instance, prolonged exposure to bright light, especially sunlight, tends to increase the temperature within the cabin of an automobile. Light transmittance can therefore be decreased based on the cabin temperature being above a threshold. Dimming can be performed based on the amount of ambient light, temperature, temperature in combination with the amount of ambient light, and other factors or combinations of factors. Accordingly, in some embodiments, the one or more sensors 150 may include an optical sensor and/or other type of sensor (e.g., a temperature sensor, or light intensity sensor) is deployed together with a dimmable LC assembly and a control unit configured to vary the light transmittance of the dimmable LC assembly based on data from the sensor. Such sensors 150 can be in various locations throughout the automobile 120 and, in some instances, may be integral with or attached to a window, e.g., as part of an LC assembly.

Another example of a sensor 150 that can be used to control dimming is an occupant sensor configured to detect the presence of a person in the automobile 120, for example, based on a seatbelt being engaged, pressure of the occupant's bodyweight against a seat, capturing an image of the occupant by an in-vehicle camera, and so on. The light transmittance of a window near or facing an occupant can be controlled to increase the occupant's comfort, and occupant sensing can be incorporated into a decision of the control unit as to whether to adjust transmittance and, if so, to what extent. For example, it may be unnecessary to adjust transmittance of a window when there is no occupant facing the window. This may be true even in the case of the front windshield 122, as the automobile 120 could be a self-driving or teleoperated vehicle with no person sitting in the driver's seat.

Although dimmable LC assemblies exist for use in other types of applications, incorporating a dimmable LC assembly into a window in a safety critical environment is challenging. As indicated above, the windows 122, 124, 126, 128, or 129 are generally curved. Thus, a dimmable LC assembly should also be curved or capable of conforming to the curvature of a window to which the dimmable LC assembly is applied. Further, automobile windows are often subject to stringent regulations designed to ensure safety. For example, Regulation No. 43 of the Economic Commission for Europe of the United Nations sets forth various performance requirements for different types of vehicle windows. Types of windows governed by Regulation No. 43 include "toughened-glass" (a single layer of glass that has been specially treated to increase its mechanical strength and to condition its fragmentation after shattering), "laminated-glass" (two or more layers of glass held together by one or more interlayer of plastic material), "treated laminated glass" (where at least one of multiple glass layers has been specially treated to increase its mechanical strength and to condition its fragmentation after shattering), and "ordinary laminated glass" (where none of the glass layers has been treated).

The performance requirements specified in Regulation No. 43 relate to fragmentation resistance, mechanical strength (e.g., ball drop tests), abrasion resistance, temperature resistance, radiation resistance, humidity resistance, light transmission, optical distortion, color, fire resistance, and other characteristics. Complying with regulations such as Regulation No. 43 can be difficult when modifying an automobile window to include a dimmable LC assembly and may also present limitations on how the dimmable LC assembly can be manufactured.

FIG. 2A shows a windscreen 210 that is dimmable. The windscreen 210 is dimmable by virtue of having a dimmable LC assembly formed integrally therewith or attached thereto. The windscreen 210 is divided into multiple segments 202-1 to 202-3, each segment 202 being independently dimmable. For instance, each segment 202 may correspond to an LC cell that can be dimmed by applying a voltage across electrodes of the LC cell. In the example of FIG. 2A, the segments are arranged vertically. The segments 202 of the windscreen 210 can be controlled individually or jointly to selectively darken different regions of the windscreen 210.

Figure 2C:
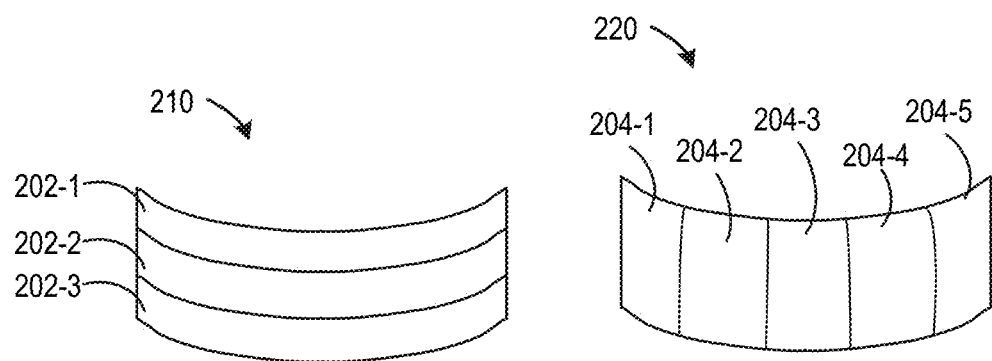
Figure 2C:
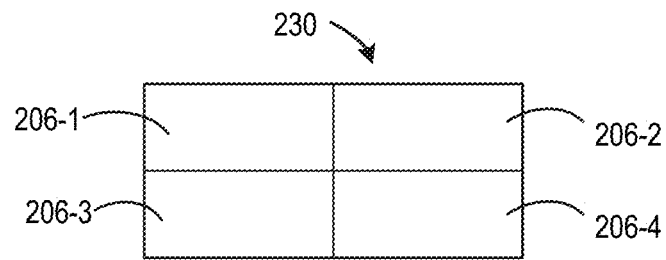

FIG. 2B shows a windscreen 220 with segments 204-1 to 204-5 that are arranged horizontally. Dimmable segments can also be arranged in two dimensions, as shown in FIG. 2C. In FIG. 2C, a sunroof 230 is divided into four segments 206-1 to 206-4. Each segment 206 may, for example, be located above a different seat of an automobile.

The segmentation illustrated in FIGS. 2A to 2C can be achieved by forming each segment as a standalone LC assembly. For example, each segment 206 can be formed as a separate LC assembly. When placed together next to each other, the LC assemblies may be separated by small gaps that are nonetheless imperceptible to the unaided eye. Alternatively, the segments 206 may correspond to different cells within a single LC assembly that has been partitioned to provide isolated chambers of liquid crystal material. The thickness of the material (e.g., rubber gaskets or other types of sealants) separating adjacent cells of such an LC assembly may also define gaps that are imperceptible or at least difficult to detect at a glance from a normal viewing distance. For example, gaps in a windscreen may be difficult to see when sitting in the driver's seat and looking through the windscreen. As shown in FIGS. 2A to 2C and in the example of FIG. 4 (discussed below), an LC assembly can be segmented in any number of ways, including with different partitioning schemes or with different shapes of segments.

Figure 3A:
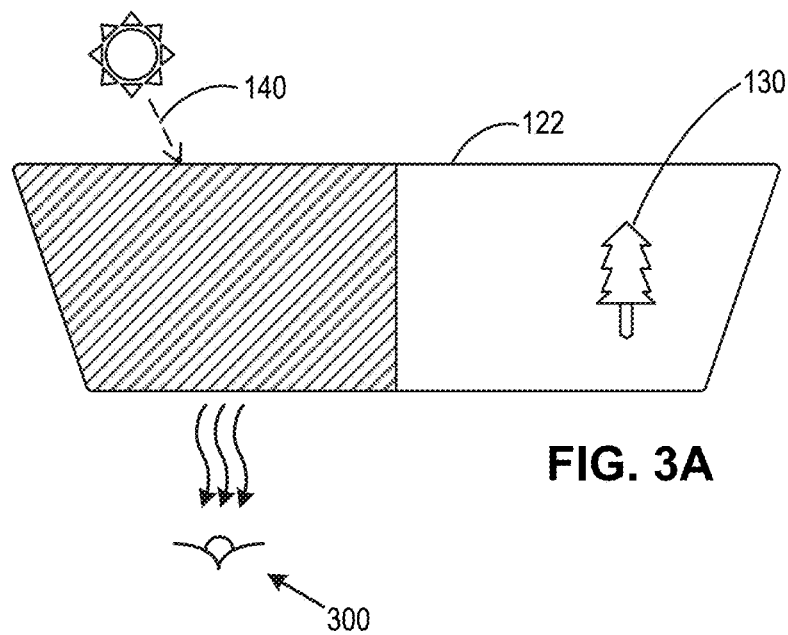
FIGS. 3A to 3C illustrate examples of different control schemes for selectively dimming segments, according to some embodiments.
Figure 3B:
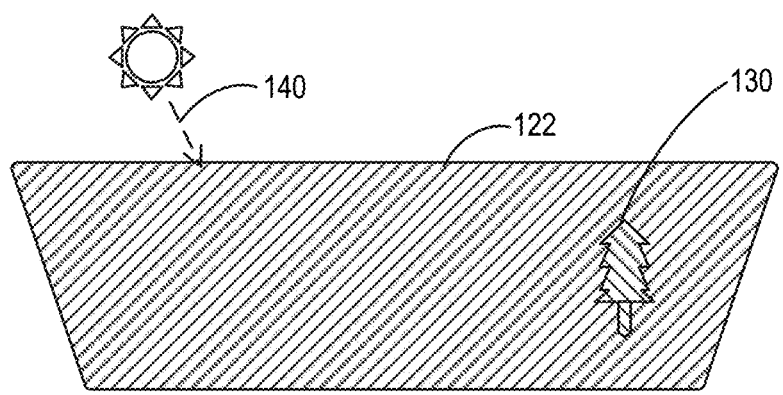
Figure 3C:
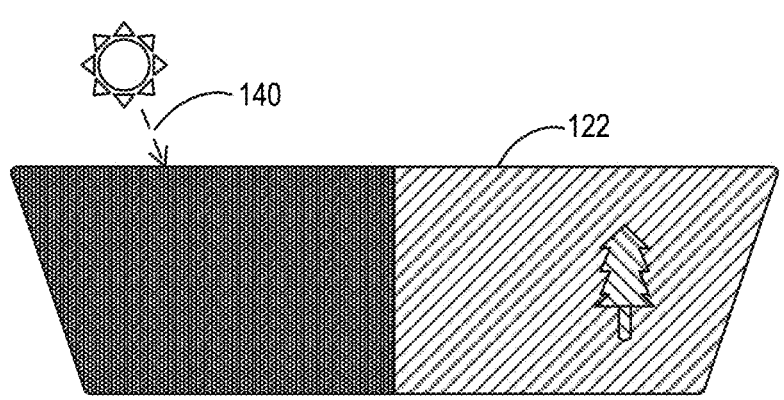

FIGS. 3A to 3C illustrate examples of different control schemes for selectively dimming segments, according to some embodiments. In FIG. 3A, the transmittance of the left (driver) side of the windscreen 122 is reduced to cause a corresponding reduction in the amount of sunlight 140 that travels through the windscreen 122 to reach an eye 300 of a person in the driver's seat of the automobile 120. Dimming can be performed manually or as discussed above, automatically based on sensor data. In FIG. 3B, the entire windscreen 122 is darkened. The darkening in FIG. 3B can be achieved by jointly controlling every segment of the windscreen 122. In FIG. 3C, the left side of the windscreen 122 is made darker than the right side to combat glare from the sunlight 140.

Dimmable LC assemblies described herein can be configured to allow light transmittance to be varied within a range such that even at the lowest level of transmittance, at least some light is able to travel through the LC assembly. For example, as shown in FIG. 3B, a tree 130 outside the automobile 120 remains visible even after dimming the entire windscreen. The ability to see through the windscreen is critical to operating an automobile and highlights an important difference between dimmable LC technology designed for safety and comfort versus dimmable LC technology designed for other types of applications such as privacy. In the former, the light transmittance can be finely controlled through many gradations of transmittance levels, and it is usually desirable to maintain a high level of optical clarity. In contrast, dimmable LC assemblies that are designed to operate as privacy screens (e.g., to shield a meeting room against prying eyes) typically have binary modes of operation: the liquid crystal is either transparent or opaque. Further, in the context of a privacy screen, opacity does not necessarily mean reducing light transmittance to zero or close to zero. Instead, the opaque mode can be one in which some light is still transmitted, but an image seen through the privacy screen is blurry or hazy.

Figure 4:
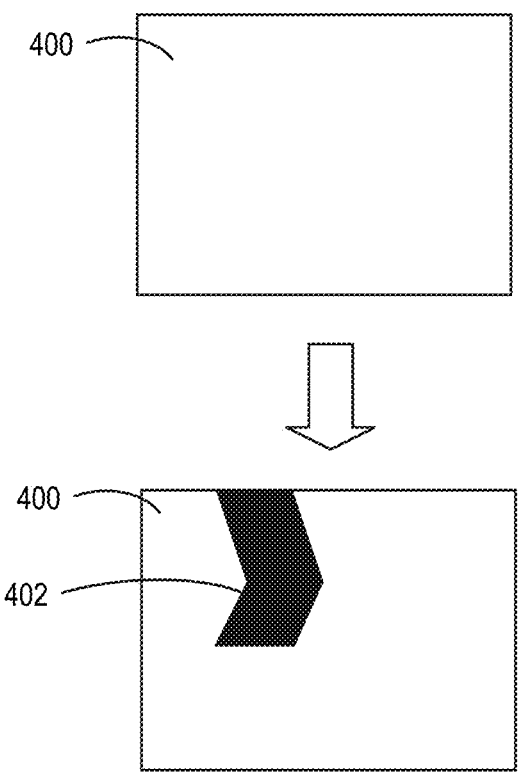
FIG. 4 shows an example of an LC assembly including a dimmable segment that is asymmetric, according to an embodiment.

FIG. 4 shows an example of an LC assembly 400 including a dimmable segment 402 that is asymmetric, according to an embodiment. The segment 402 is shaped as a polygon. However, segments can be formed in any shape based on the geometry of the LC cells to which the segments correspond. An LC assembly that includes a dimmable segment can also include one or more non-dimmable segments. For example, the entire area outside of the segment 402 could be made non-dimmable by omitting from this area one or more components that contribute to the dimming capabilities of the segment 402. For instance, the area outside of the segment 402 may not have electrodes or polarizers.

Figure 5A:
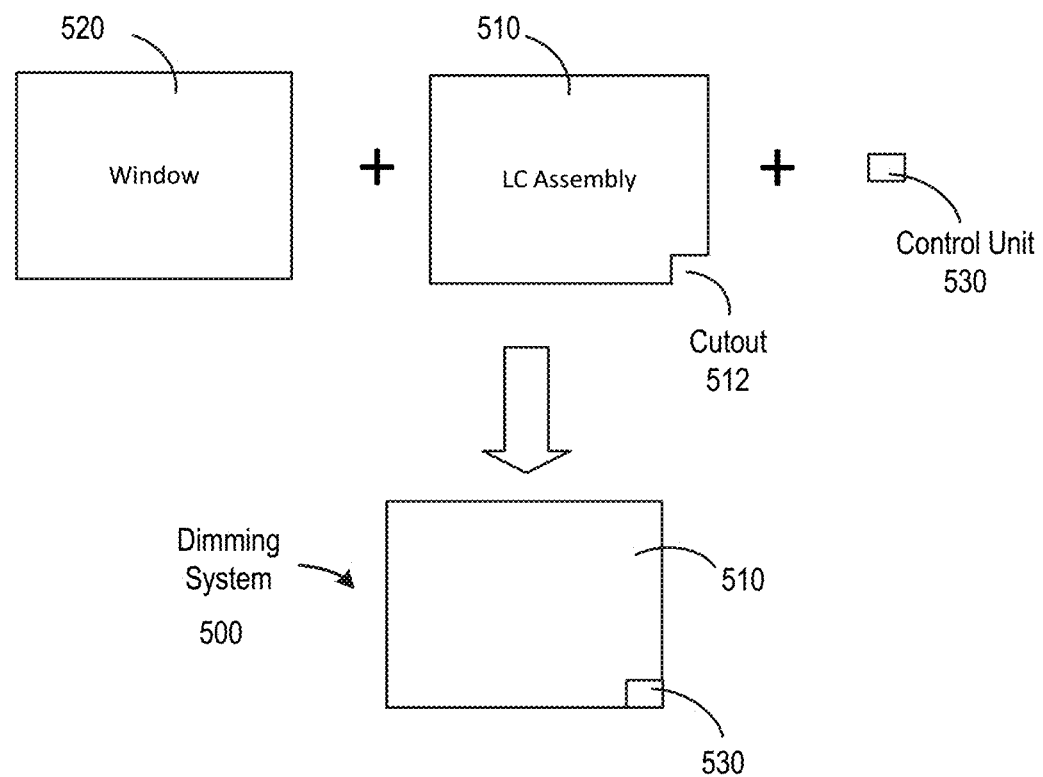
FIGS. 5A and 5B show an example of a dimming system according to an embodiment.

FIG. 5A shows an example of a dimming system 500 including an LC assembly 510 attached onto a window 520, according to an embodiment. The LC assembly 510 may correspond to any of the dimmable LC assemblies described herein. For instance, LC assembly 510 can include a TN liquid crystal cell which, as discussed below, includes polarizers on opposite sides of the liquid crystal layer. As shown in FIG. 5A, the LC assembly is substantially the same size and shape as the window 520, except that the LC assembly includes a small cutout 512 in one corner. The cutout provides space for attachment of a control unit 530 to the window 520.

The LC assembly 510 and the control unit 530 can be provided in a kit that can further include a flexible cable for electrically coupling the LC assembly 510 and the control unit 530, an adhesive for attaching the LC assembly 510 and/or the control unit 530 to the window 520, a tool for squeezing out air bubbles between the LC assembly 510 and the window 520 (e.g., a squeegee), and/or other accessories that facilitate installation of the various components of the dimming system 500.

Figure 5B:
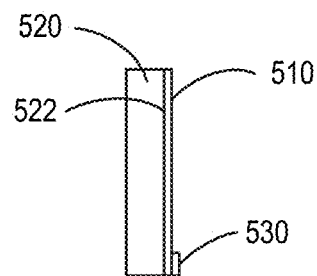

FIG. 5B is a side view of the dimming system 500. As shown in FIG. 5B, the LC assembly 510 is attached to a surface 522 of the window 520. Although not strictly necessary, it is generally preferable for the surface 522 to be an interior surface of the window 520, e.g., facing the cabin of an automobile or the inside of a building or room. Such placement would protect the LC assembly 510 against damage or contaminants from the exterior environment. LC assembly 510 can be attached to the surface 522 in various ways. One option for attaching LC assembly 510 is to use a transparent adhesive that can be sprayed or otherwise applied to the surface 522 and/or to a surface of the LC assembly 510. The adhesive can be water-based or solvent-based. For instance, the adhesive could be a solution of water mixed with soap. After wetting the LC assembly 510 or the surface 522 with the solution, the LC assembly 510 can be placed in contact with the surface 522 and the solution causes the LC assembly 510 to cling to surface 522 in the manner of a thin film. Once the solution dries, the soap forms a bond that holds the LC assembly 510 to the surface 522. Accordingly, the dimming system 500 corresponds to an overall LC assembly formed by combining LC assembly 510, window 520, and control unit 530. FIGS. 5A and 5B are merely an example. In other implementations, the control unit 530 may be located elsewhere, for example, located at the center of the window 520 and attached to a surface of the LC assembly 510 rather than being in direct contact with the window 520.

As shown in FIG. 5B, the LC assembly 510 can be significantly thinner than the window 520. Further, the LC assembly 510 can be formed using a flexible substrate and may optionally include additional constituent layers that are flexible. Traditional liquid crystal cells are formed with liquid crystal material sandwiched between a pair of rigid substrates (e.g., glass). According to some embodiments, a flexible substrate can be substituted for at least one of these rigid substrates. Moreover, a flexible substrate can be used as an outermost layer of the LC assembly 510. Including a flexible substrate is advantageous because it allows the LC assembly 510 to conform to the surface 522 of the window. Although the surface 522 is shown as being flat, there can be minor differences in height along the surface 522. These differences may be imperceptible to the unaided eye but can lead to gaps or air bubbles between the LC assembly 510 and the surface 522. The gaps or air bubbles may be noticeable to a user and can also increase the chances of the LC assembly 510 becoming delaminated from the window 520. A flexible substrate would reduce the number of occurrences of such gaps or air bubbles, and gaps or bubbles that remain can be squeezed out by applying manual pressure or using a tool such as a squeegee or rolling pin. The squeezing can be performed, for example, before the adhesive solution dries. Additionally, as mentioned above, some windows are curved. Including a flexible substrate would help the LC assembly 510 conform to the curvature of such a window, for example, one of the windows 122, 124, 126, 128, or 129 in FIG. 1.

Control unit 530 is configured to vary the light transmittance of the LC assembly 510 by outputting one or more control signals to the LC assembly 510. Accordingly, control unit 530 can include an electrical interface to the LC assembly 510. The electrical interface can include a physical connector for establishing a wired connection to electrodes of the LC assembly 510. For example, the LC assembly 510 may include a connector that can be coupled to the connector of the control unit via a flexible cable. Control unit 530 can be attached to the window 520 in a similar manner to the LC assembly 510, e.g., using an adhesive. A more detailed example of a control unit is described below in reference to FIG. 6.

In an alternative embodiment, LC assembly 510 may not include any cutout to accommodate the control unit 530. Instead, control unit 530 may be located outside the area of the window 520 (e.g., mounted on a wall next to the window 520) or on the LC assembly 510 itself. In general, there are no restrictions on where the control unit 530 can be placed so long as the control unit 530 is able to supply its control signals for varying the transmittance of the LC assembly 510. For example, in an automobile, the control unit 530 could be co-located with or integral to an electronic control unit (ECU) of the automobile and could be connected to multiple LC assemblies via cables running inside the body of the automobile. As another example, if the window 520 has a frame, the control unit 530 could be placed along an edge or corner of the frame.

Control unit 530 can be powered by an internal battery or an external power source. In some embodiments, such as the embodiment shown in FIG. 6, the power source is a rechargeable battery. Various recharging methods can be used to replenish the energy stored in the battery. For example, a photovoltaic cell can be used to recharge the battery using ambient light, as shown in FIG. 6.

Figure 6:
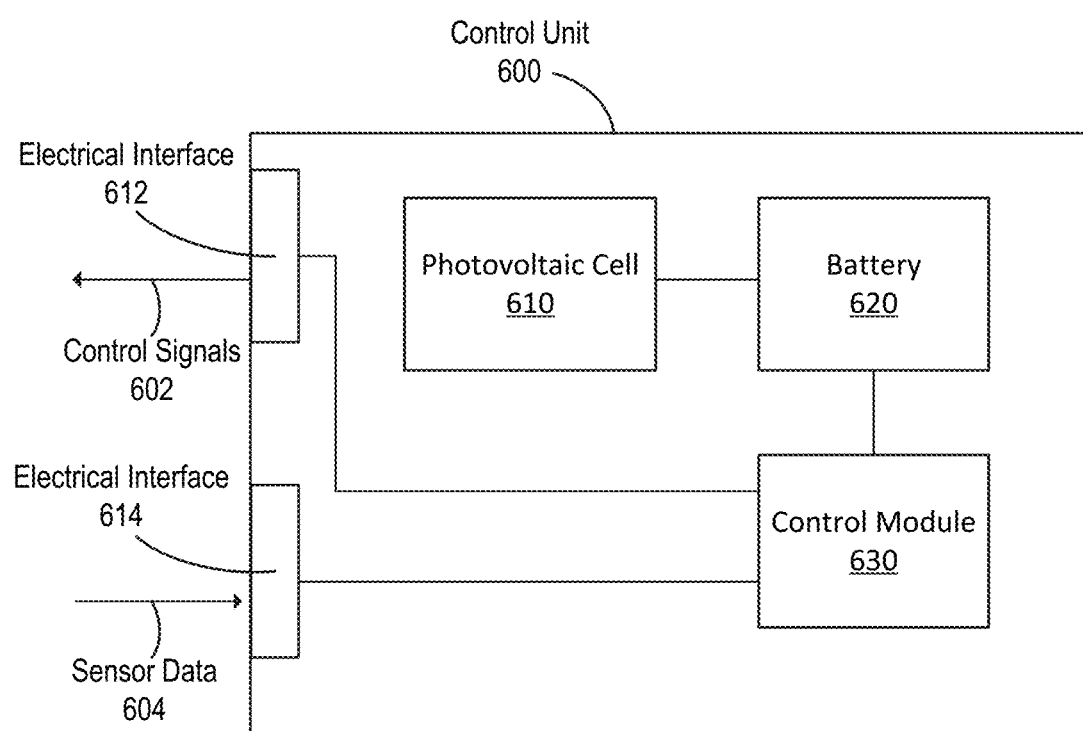
FIG. 6 is a simplified block diagram of a control unit 600 according to an embodiment.

FIG. 6 is a simplified block diagram of a control unit 600 according to an embodiment. The control unit 600 may correspond to control unit 530 in FIG. 5A and includes a photovoltaic cell 610, a battery 620, and a control module 630. In the example of FIG. 6, the photovoltaic cell 610, the battery 620, and the control module 630 are co-located. For instance, control unit 600 may include a printed circuit board (PCB) onto which the photovoltaic cell 610, the battery 620, and the control module 630 are each mounted. Control unit 600 may further include a housing with an opening or window that permits light to enter the photovoltaic cell 610.

Photovoltaic cell 610 is configured to convert light into an electrical signal that recharges the battery 620. If the control unit 600 is placed in an area not covered by the LC assembly (e.g., the cutout 512 in FIG. 5A), the photovoltaic cell 610 will be able to receive light unmodified by passage through the LC assembly. Alternatively, if the control unit 600 is placed such that the light received by the photovoltaic cell 610 is light that has passed through the LC assembly, the photovoltaic cell 610 will generate less energy when the light transmittance of the LC assembly is set lower. However, it can be expected that even at the lowest transmittance level, some light will pass through the LC assembly. Accordingly, the photovoltaic cell 610 is able to recharge the battery 620 any time the LC assembly also receives light.

Battery 620 can be any type of rechargeable battery and is preferably of a small form factor so as to minimize the footprint of the control unit 600. For instance, battery 620 could be a lithium-ion coin cell battery. Battery 620 supplies power to the control module 630 to enable the control module 630 to perform its operations.

Control module 630 can be implemented in hardware and/or software. For instance, control module 630 can be implemented using circuitry such as an integrated circuit (IC), a field-programmable gate array (FPGA), a microcontroller, and the like. Control module 630 is configured to set the transmittance level of an LC assembly through control signals 602 that can be output from an electrical interface 612 of the control unit 600. For instance, electrical interface 612 may include a connector or socket adapted to receive a cable including a first wire leading to a first electrode of the LC assembly and a second wire leading to a second electrode of the LC assembly. The first wire and the second wire may each carry a corresponding signal of the control signals 602.

Control module 630 may set the transmittance level based on manual input or automatically. Manual input can be supplied, for example, through a touch sensor or physical button on the control unit 600. In some embodiments, control module 630 may set the transmittance level based on wireless commands from a user device, for example, commands sent from a mobile phone via a Bluetooth or WiFi connection. In addition, or as an alternative to manual input, the control module 630 may use sensor data to determine at what level to set the transmittance. As discussed above, such sensors can include an optical sensor, a temperature sensor, or other types of sensors. Accordingly, as shown in FIG. 6, the control unit 600 can include an additional electrical interface 614 through which sensor data 604 is received from one or more external sensors. In some implementations, the electrical interface 614 may be a wireless interface. Further, in some implementations, electrical interface 612 and electrical interface 614 are combined into a single interface, e.g., a communication bus.

The one or more sensors that provide the sensor data 604 can be in various locations, including on the LC assembly or window, on the control unit 600, or elsewhere in the environment (e.g., in the cabin of an automobile). Additionally, a sensor that provides the sensor data 604 can be part of the control unit 600 itself. For example, the photovoltaic cell 610 may be used as an optical sensor. Since the amount of energy produced by the photovoltaic cell 610 is proportional to the amount of light incident upon the photovoltaic cell 610, an output of the photovoltaic cell 610 (e.g., the electrical signal that recharges the battery 620) can be measured to determine the intensity of the ambient light. This determination can be performed by the control module 630, possibly taking into consideration the present transmittance level of the LC assembly depending on whether the photovoltaic cell 610 receives unmodified light or light modified by passage through the LC assembly. Alternatively, a separate optical sensor, such as a photodiode, may be provided. For example, a photodiode may be integrated into an exterior facing side of the LC assembly so that the photodiode receives light unmodified by passage through the LC assembly.

Figure 7A:
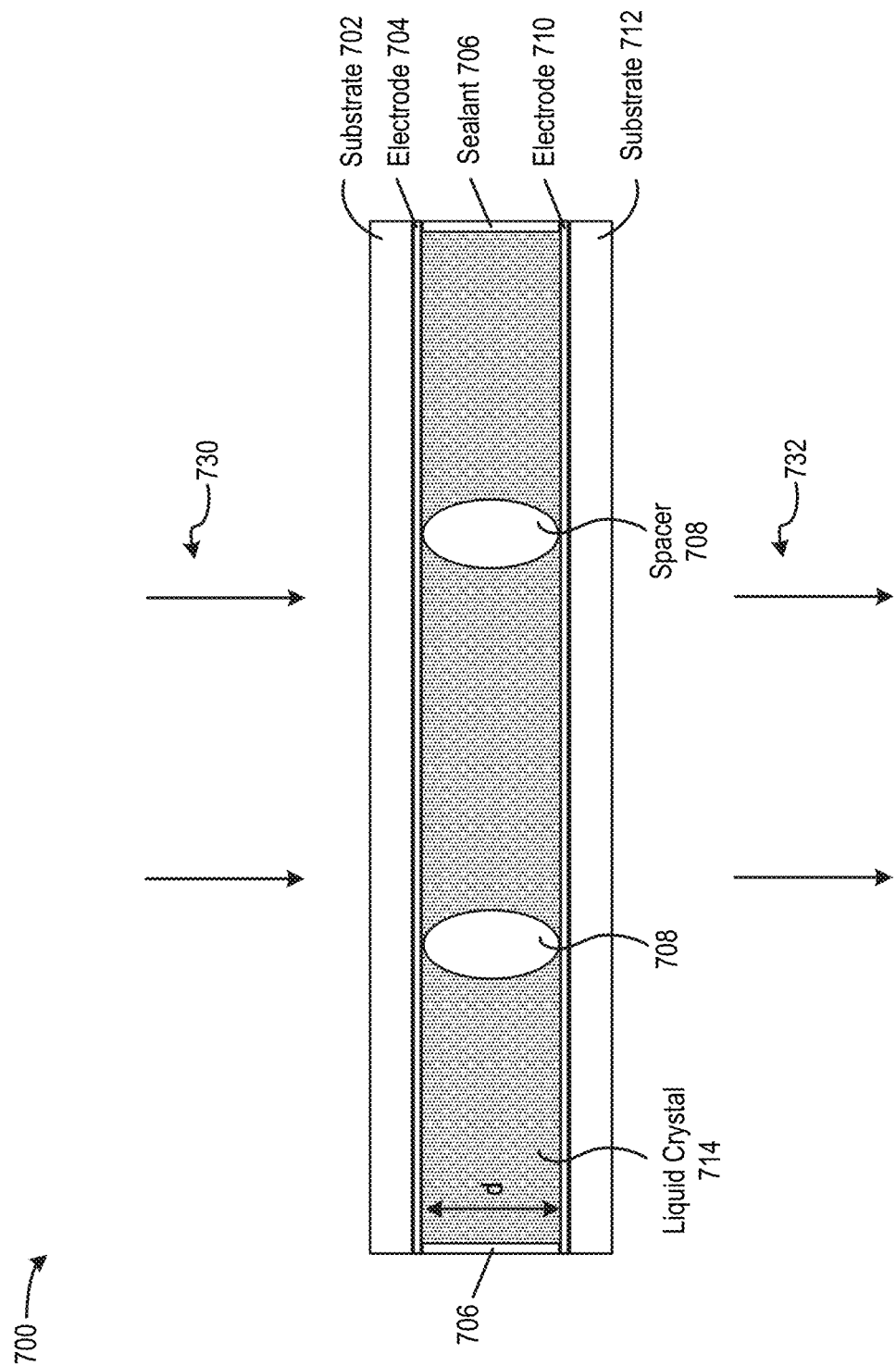
Figure 7B:
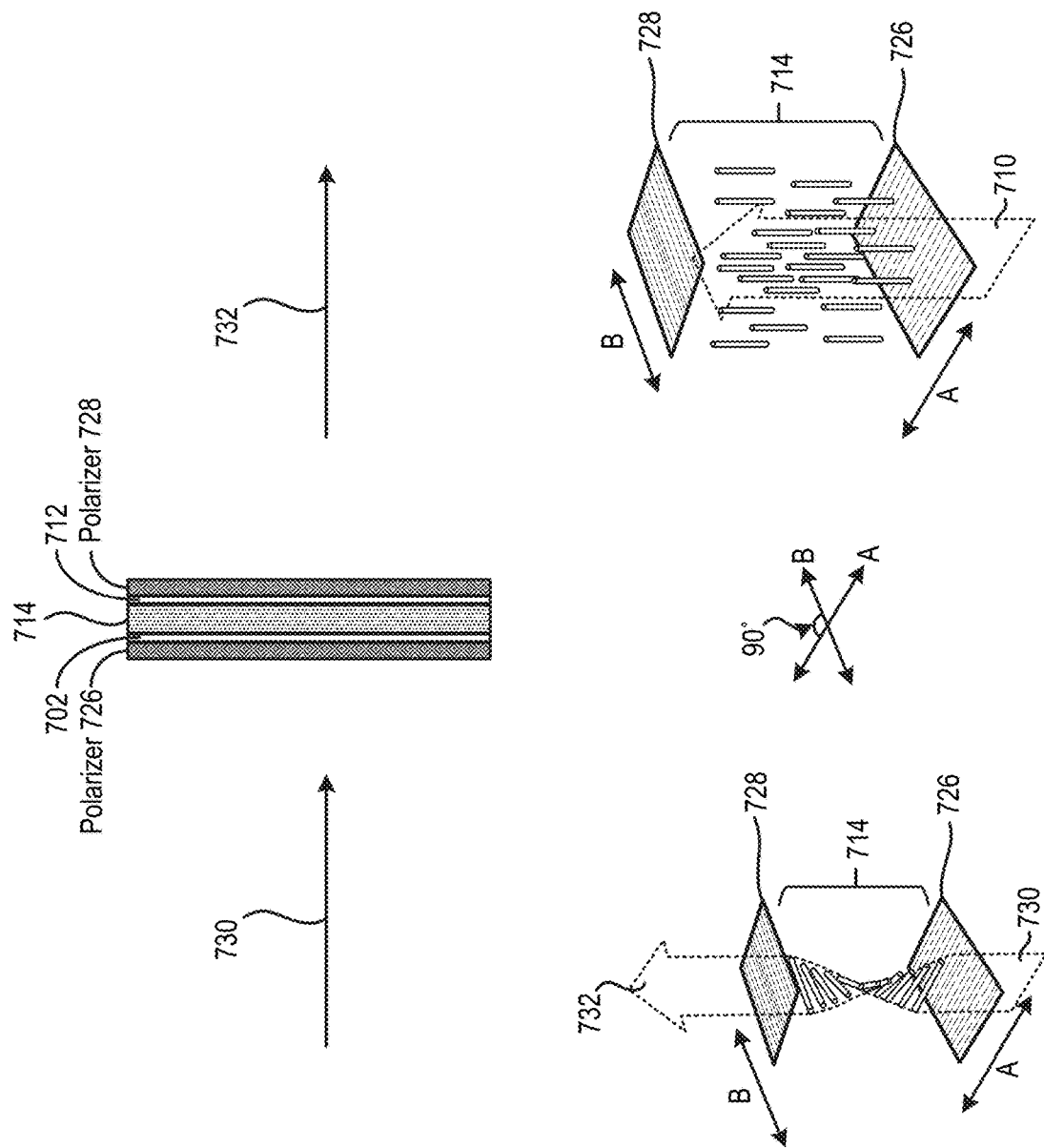

FIGS. 7A to 7C illustrate examples of liquid crystal cells that can be used to form an LC assembly according to one or more embodiments. In FIG. 7A, a liquid crystal cell 700 includes a first substrate 702, a first electrode 704, a sealant 706, spacers 708, a second electrode 710, a second substrate 712, and a liquid crystal 714.

First substrate 702 and second substrate 712 can be made of transparent materials to let incoming light 730 propagate through liquid crystal 714 to become outgoing light 732. First substrate 702 and second substrate 712 can be made of materials such as glass or some other rigid material. Alternatively, at least one of the substrates 702, 712 may be formed of a flexible material such as polycarbonate (PC), polyethylene terephthalate (PET), or cellulose triacetate (TAC), which allows liquid crystal cell 700 to conform to a curved surface such as a windshield, a curved architecture glass panel, etc.

Sealant 706 can define a liquid crystal cell, with the cell space between first substrate 702 and second substrate 712 filled by liquid crystal 214. Sealant operates as a gasket that isolates the liquid crystal 714 against environmental influences and to securely confine the liquid crystal 714, which is sandwiched between the substrates 702 and 712. Sealant 706 can be formed of a plastic, elastomeric, or other relatively soft (in relation to the substrates 702 and 712) material, for example, using plastic injection molding. Further, in some embodiments, an additional seal (not depicted) may be provided as a circumferential seal between the LC cell 700 and other layers (e.g., a glass panel) of an LC assembly incorporating the LC cell 700. When provided, such a circumferential seal may seal the sandwich structure in a "floating" manner by operating as a cushion between the sandwich structure and the other layers of the LC assembly.

Spacers 708 can provide structural support between first substrate 702 and second substrate 712 to maintain a uniform cell gap distance d between the substrates. Spacers 208 can include, for example, silica gel balls, plastic balls, etc., and can be coated with a black coating to reduce light transmission. Adhesion between spacers 208 and the electrodes 704 and 710 may occur as a result of a baking process. The temperature and pressure at which the baking is performed are typically significantly lower than that used for laminating automotive windows that incorporate polyvinyl butyral (PVB) as a constituent layer.

PVB is often used in automotive windows to improve impact resistance and reduce fragmentation. Accordingly, one aspect of the present disclosure relates to techniques for forming an LC assembly that includes one or more PVB layers. This would enable the LC assembly to be incorporated into an automobile window without requiring the substitution of another material in place of PVB. Automotive manufacturers are familiar with PVB and processes for creating windows using PVB and switching to a different material may not be possible without new manufacturing processes. Since automotive manufacturers may not be willing to invest time and other resources into developing such new manufacturing processes, an LC assembly that is compatible with PVB would help bring to market LC assemblies for use in automotive applications.

First electrode 704 and second electrode 710 may correspond to coatings of electrically conductive material onto the substrates 702 and 712. For example, first electrode 704 and second electrode 710 may comprise Indium tin oxide (ITO), which would permit the electrodes 704 and 710 to conduct a voltage that establishes an electric field across liquid crystal 714 to change the orientations of the liquid crystal particles. As will be described below, the orientations of the liquid crystal particles of liquid crystal 714 can adjust the overall light transmittance of liquid crystal cell 700 and the intensity of outgoing light 732.

First electrode 704 and second electrode 710 can include rubbing patterns to align liquid crystal particles of liquid crystal 714 in a default orientation, which can set an initial/default state of light transmittance of liquid crystal cell 700. Alternatively, in some embodiments, the rubbing patterns may be located on additional layers situated between the electrodes 704, 710 and the liquid crystal 714. Such additional layers could be formed, for example, using polyamide (PI).

FIG. 7A is a simplified example intended to illustrate components that are typical of the LC assemblies described herein with respect to other embodiments. As will be apparent from the discussion of such other embodiments (e.g., the embodiments shown in FIGS. 9A to 9C), an LC assembly can include more or fewer components, or a different arrangement of components. For example, in some embodiments, an LC assembly may include an infrared (IR) filter for blocking IR light and/or an ultraviolet (UV) filter layer for blocking UV light. A UV or IR filter can be beneficial for glare protection as well as protection against overheating due to electromagnetic radiation at wavelengths associated with IR or UV. Similarly, in some embodiments, an LC assembly may include an anti-reflective coating as one or more layers.

FIG. 7B illustrates one example configuration of liquid crystal 714 to provide adjustable light transmittance. As shown in FIG. 7B, liquid crystal 714 can be configured as a twisted nematic (TN) liquid crystal. The liquid crystal particles can be aligned by the above-described rubbing patterns to form a twisted, helical structure in the absence of an applied electric field. The helical structure can rotate the polarization axis of polarized light as the polarized light traverses the liquid crystal layer, with the angle of rotation adjustable by an electric field applied across the liquid crystal layer, e.g., an electrical field formed using control signals produced by the control unit 600. As the polarized light traverses through the liquid crystal layer, the helical structure causes the polarization axis of the polarized light to rotate by a certain angle (e.g., a 90-degree angle) determined by the rubbing patterns. If an electric field is applied, the liquid crystal particles can align in parallel with the electric field. The polarization axis of the polarized light can be maintained and not rotated as the light traverses the aligned liquid crystal particles. Embodiments featuring TN liquid crystal are not limited to configurations that rotate the helical structure by a 90° twist angle. For example, in some implementations, an LC assembly may be configured to rotate the helical structure anywhere from 180° to 270° (a feature of super-twisted nematic (STN) displays). In some implementations, the rotation may be less than 90° (sometimes used to form mixed-mode TN (MTN) displays). Further, TN liquid crystal can include nematic liquid crystal with a chiral dopant that imparts chirality to the nematic liquid crystal. Accordingly, TN liquid crystal can be any liquid crystal that has a twisted structure in a default or voltage-off state, i.e., prior to applying an electric field to "untwist" the liquid crystal particles. Additionally, although FIG. 7B depicts a single rotational direction, an LC assembly can, in some implementations, an LC assembly can have liquid crystal with two or more rotational directions to, for example, permit a different alignment of liquid crystal particles in a first segment than liquid crystal particles in a second segment.

In certain embodiments, a conductive layer corresponding to an electrode may be divided into different regions. For example, the layer corresponding to electrode 704 and the layer corresponding to electrode 710 can each be divided into different regions that correspond to segments, which can differ in shape and/or size. The different regions can be formed by chemically or mechanically etching the conductive layer to form etched patterns. The etched patterns are distinct from the above-described rubbing patterns and can be used to form discrete segments or, in the case of an LCD display, discrete pixels (e.g., red, green, or blue sub-pixels). Such segments can be individually dimmable by controlling the liquid crystal alignment in the segments to display stripes, logos, text, or other graphics, with or without the aid of an electrically controllable illumination source such as a backlight. For example, an LC assembly can be configured as a seven-segment display, where dimming different combinations of the seven segments results in display of different numerals. Accordingly, a conductive layer can include multiple pairs of electrodes, where each pair of electrodes corresponds to a different region that is individually controllable through application of a corresponding electrical signal to establish a voltage across the pair of electrodes.

Liquid crystal 714, as well as first substrate 702 and second substrate 712, can be sandwiched between a first polarizer layer 726 and a second polarizer layer 728. Alternatively, the polarizer layers 726, 728 can be intervening layers between the substrates 702, 712 and the liquid crystal 714. In a normally-white configuration, first polarizer layer 226 can have a polarization axis A, whereas second polarizer layer 228 can have a polarization axis B. The two polarization axes can form a 90-degree angle with respect to each other. Incoming light 730 can become linearly polarized by first polarizer layer 726. The linearly polarized light can be rotated by liquid crystal 714 by an angle configured by the TN structure as described above. Maximum light transmittance can be achieved in a case where no electric field is applied. When no electric field is applied, the liquid crystal 714 rotates the polarization axis of the polarized light to align with the polarization axis B of second polarizer layer 728. Minimum light transmittance can be achieved when the polarization axis of the polarized right is not rotated, due to application of an electric field, such that the polarization axis of the polarized light becomes perpendicular to the polarization axis B of second polarizer layer 728. In such a case, the polarized light aligns with the absorption axis of second polarizer layer 728 and can be absorbed by second polarizer layer 728 at a maximum absorption rate. The magnitude of the electric field determines the angle of rotation of the polarized light, which can vary the portion of incoming light 730 that passes through liquid crystal cell 714 as outgoing light 732. A typical range of light transmittance achievable by a TN liquid crystal can be between 0.5% to 36%.

TN liquid crystal can provide various advantages compared to other liquid crystal technologies. For example, TN liquid crystal typically has extremely fast response characteristics and can adjust the light transmittance within a very short period of time (e.g., 100 milliseconds or less). TN liquid crystal can also provide good light blocking. For example, the minimum light transmittance of TN liquid crystal can reach as low as 0.1%. Additionally, as a TN liquid crystal does not have suspended particles or a polymer to scatter light, a TN liquid crystal cell may introduce less haze and may improve visibility across a range of light transmittance levels.

Additionally, as discussed above, it can be advantageous to include a flexible substrate in an LC assembly. For example, the substrate 702 and/or the substrate 712 may comprise a transparent flexible material (e.g., PET or PVB). Accordingly, in some embodiments, a dimmable LC assembly includes: a flexible substrate, a liquid crystal layer including TN liquid crystal, and polarizer layers. Additionally, such an LC assembly can include a rigid transparent layer (e.g., glass or PC) configured to serve as a structural support for the LC assembly and to operate as a window. This rigid transparent layer can be an additional layer laminated together with a substrate (e.g., substrate 702 or substrate 712), possibly with one or more intervening layers between the rigid transparent layer and the substrate (e.g., a connecting layer that holds the rigid transparent layer and the substrate together). The rigid transparent layer can therefore be formed integrally with the LC assembly. However, as discussed above in reference to FIG. 5A, it is also possible to manufacture the LC assembly separately so that the LC assembly can later be attached onto a window as a thin film. Optionally, the rigid transparent layer may be curved.

FIG. 7C illustrates another example configuration of liquid crystal 714 to provide adjustable light transmittance. In FIG. 7C, liquid crystal cell 700 does not include the polarizer layers 726 and 728. The use of polarizers is unnecessary in the example of FIG. 7C because liquid crystal 714 can be configured as a Guest-Host (GH) liquid crystal including liquid crystal particles 740, which act as a host, and dye particles 750, which act as a guest. Liquid crystal particles 740 and dye particles 750 can modulate the light transmittance based on the Guest-Host effect. Specifically, the dye particles 750 can be configured to absorb light having an electric field that is perpendicular to the long axis of the dye particles.

In FIG. 7C, the rubbing patterns described above in reference to FIG. 7A can have anti-parallel rubbing directions to set the initial orientation of the liquid crystal particles and dye particles based on an operation mode of liquid crystal cell. In a normally-white mode where a liquid crystal cell is in a transparent state when no electric field is applied, the rubbing directions can be configured such that the long axis of the dye particles is parallel with the electric field of incoming light 730, and the absorption of light by the dye particles can be set at the minimum. When an electric field is applied across liquid crystal particles 740, the orientation of liquid crystal particles 740, as well as dye particles 750, can change accordingly. As a result, the portion of incident light 730 absorbed by dye particles 750, and the light transmittance of liquid crystal cell 700, can be adjusted by the electric field applied across liquid crystal 714. On the other hand, in a "normally-dark" mode, the rubbing directions can be configured such that the long axis of the dye particles is perpendicular to the electric field of incoming light 730, which leads to maximum absorption of light 730 by the dye particles. The absorption can be reduced by changing the orientation of the dye particles when an electric field is applied across the liquid crystal.

The example configurations shown in FIGS. 7B and 7C are not mutually exclusive. For example, in some implementations, a liquid crystal can be both a TN liquid crystal (having a twisted structure) and a GH liquid crystal (having dye particles).

By omitting polarizers, a GH-based LC assembly can increase the overall achievable light transmittance while providing reasonable light blocking properties. For example, using the Guest-Host effect, the light transmittance range can be between 10% to 80%. Moreover, a GH liquid crystal can also have fast response characteristics and can adjust the light transmittance within a very short period of time. Further, like TN liquid crystal, a GH liquid crystal does not have suspended particles or a polymer medium to scatter the light. Additionally, the color of the dye particles of a GH liquid crystal can be chosen to selectively transmit light of a particular color while blocking other colors.

In some embodiments, an LC cell can include vertical alignment (VA) liquid crystals. In VA liquid crystals, the liquid crystal particles are homeotropic, meaning they are aligned perpendicular to the substrate surface, in the absence of an applied electrical field. The homeotropic liquid crystal particles can be realigned to be parallel to the substrate surface by applying an electrical field. A VA liquid crystal generally has negative dielectric anisotropy. In some embodiments, the VA liquid crystal in an LC cell is a dual frequency liquid crystal (DFLC) that has positive dielectric anisotropy at low frequencies and negative dielectric anisotropy at high frequencies and is referred to as dual VA. VA liquid crystals can also be GH liquid crystals in which dye particles have been introduced.

Figure 8A:
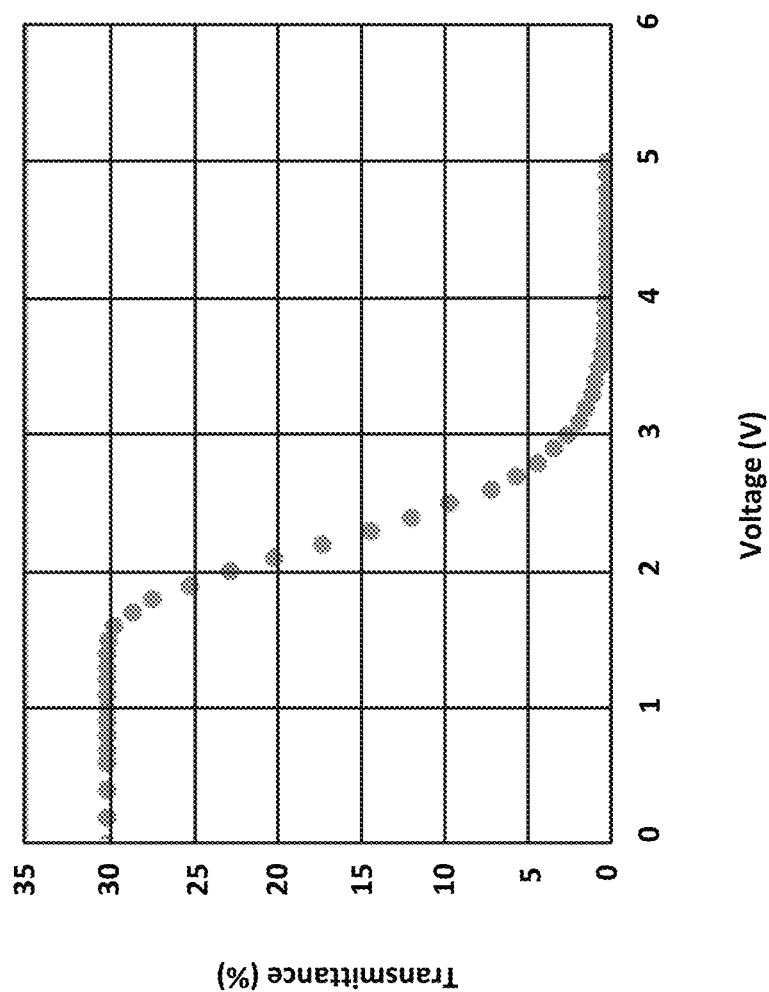
FIGS. 8A to 8D show voltage-transmittance curves for some example dimmable LC assemblies.

FIGS. 8A to 8D show voltage-transmittance (V-T) curves for some example dimmable LC assemblies. In FIG. 8A the LC assembly includes TN liquid crystal configured in the normally-white mode and has the following characteristics: voltage at 90% transmittance (V90)=1.82 V, voltage at 10% transmittance (V10)=2.95 V, cell gap=6 micrometers ($\mu$m), twist angle=60°, wavelength=550 nanometers (nm), and frequency=64 Hertz (Hz). The frequency is that of an electrical signal used to drive the LC assembly (e.g., to establish a voltage across electrodes). The wavelength is that of incident light, in this example, green light. For a given voltage, the transmittance is generally stable with a small degree of variability across wavelengths of interest (e.g., the visible spectrum). For example, transmittance may vary between approximately 20% and approximately 30% from 400 to 700 nm. As shown in FIG. 8A, the V-T curve is relatively flat between 0 and 1.5 V (maximum transmittance of approximately 30%) and then slopes downward toward a minimum transmittance of approximately 0.1% at around 4 V.

Figure 8B:
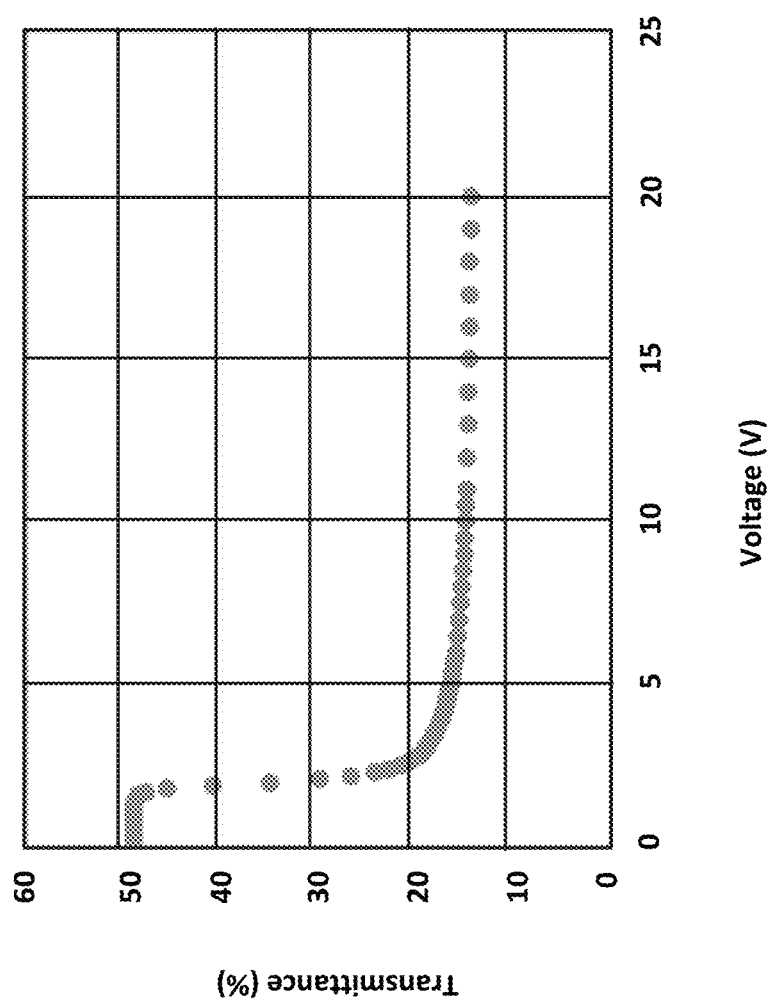

In FIG. 8B, the LC assembly includes GH liquid crystal configured in the normally-white mode and has the following characteristics: V90=1.8 V, V10=3.7 V, cell gap=9 $\mu$m, twist angle=360°, wavelength=550 nm, and frequency=64 Hz. As shown in FIG. 8B, the V-T curve is significantly steeper compared to FIG. 8A. Because of the steeper V-T curve, the LC assembly of FIG. 8B may require more precise control over the applied electrical field, i.e., the voltage, across the sloped portion of the curve. However, it is feasible to configure a control module (e.g., control module 630 in FIG. 6) to implement such control. For instance, control module 630 could look up a table stored in a memory of the control unit 600, where the table maps different voltage points to their corresponding transmittance levels. A lookup table for the configuration in FIG. 8B could include finer voltage gradations compared to a lookup table for the configuration in FIG. 8A. Alternatively, in some embodiments, the control module may be programmed or otherwise configured with a nonlinear function approximating the actual V-T curve of the LC assembly. Another performance difference between the configuration of FIG. 8B and the configuration of FIG. 8A is that the minimum transmittance level is higher in FIG. 8B.

Figure 8C:
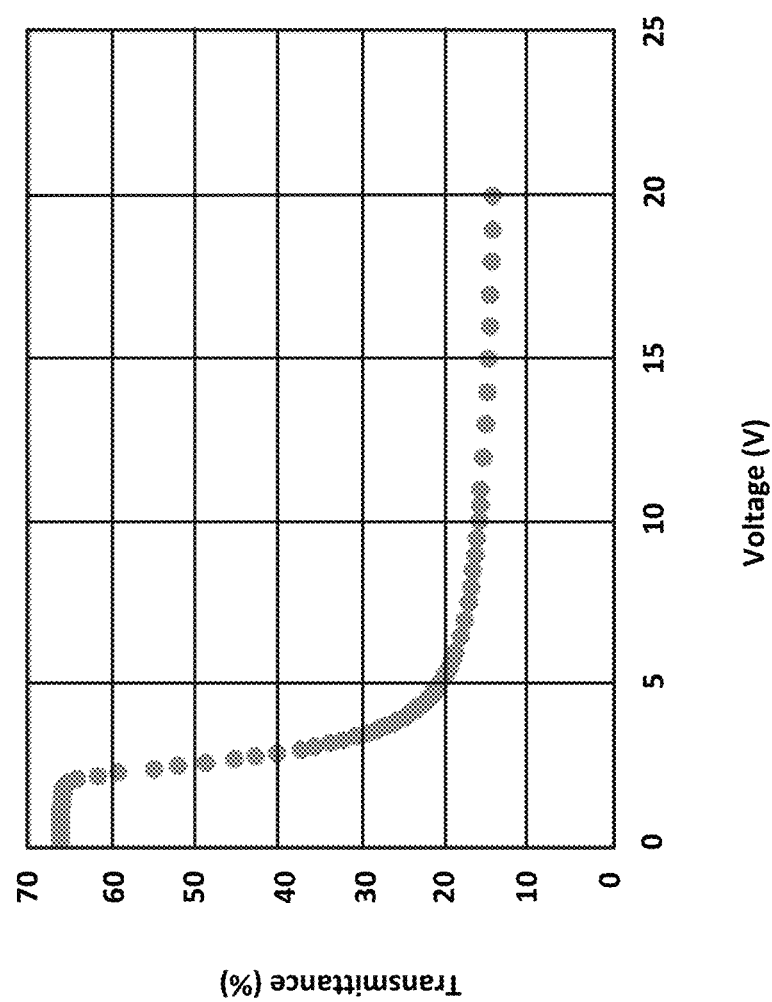

In FIG. 8C, the LC assembly includes GH liquid crystal (dual VA) configured in the normally white mode and has the following characteristics: V90=2.24 V, V10=5.5 V, cell gap=9 $\mu$m, twist angle=0°, wavelength=550 nm, and frequency=64 Hz. Compared to the configurations in FIGS. 8A and 8B, the dual VA configuration in FIG. 8C provides for a higher maximum transmittance than in FIGS. 8A and 8B, and a minimum transmittance about the same as in FIG. 8B.

Figure 8D:
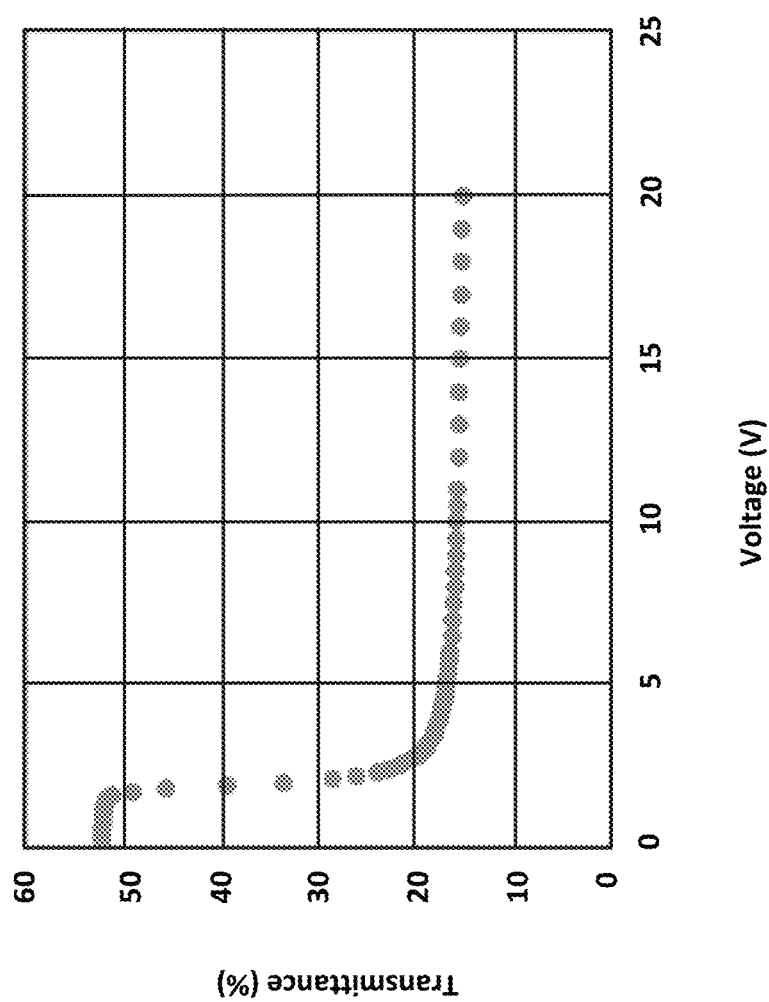

FIG. 8D shows a V-T curve for another GH based configuration. In FIG. 8D, the LC assembly includes GH liquid crystal configured in the normally-white mode and has the following characteristics: V90=1.72 V, V10=3.1 V, cell gap=9 $\mu$m, twist angle=360°, wavelength=550 nm, and frequency=64 Hz. The V-T curve in FIG. 8D is similar to the curve in FIG. 8B but features a slightly higher maximum transmittance level.

Figure 9A:
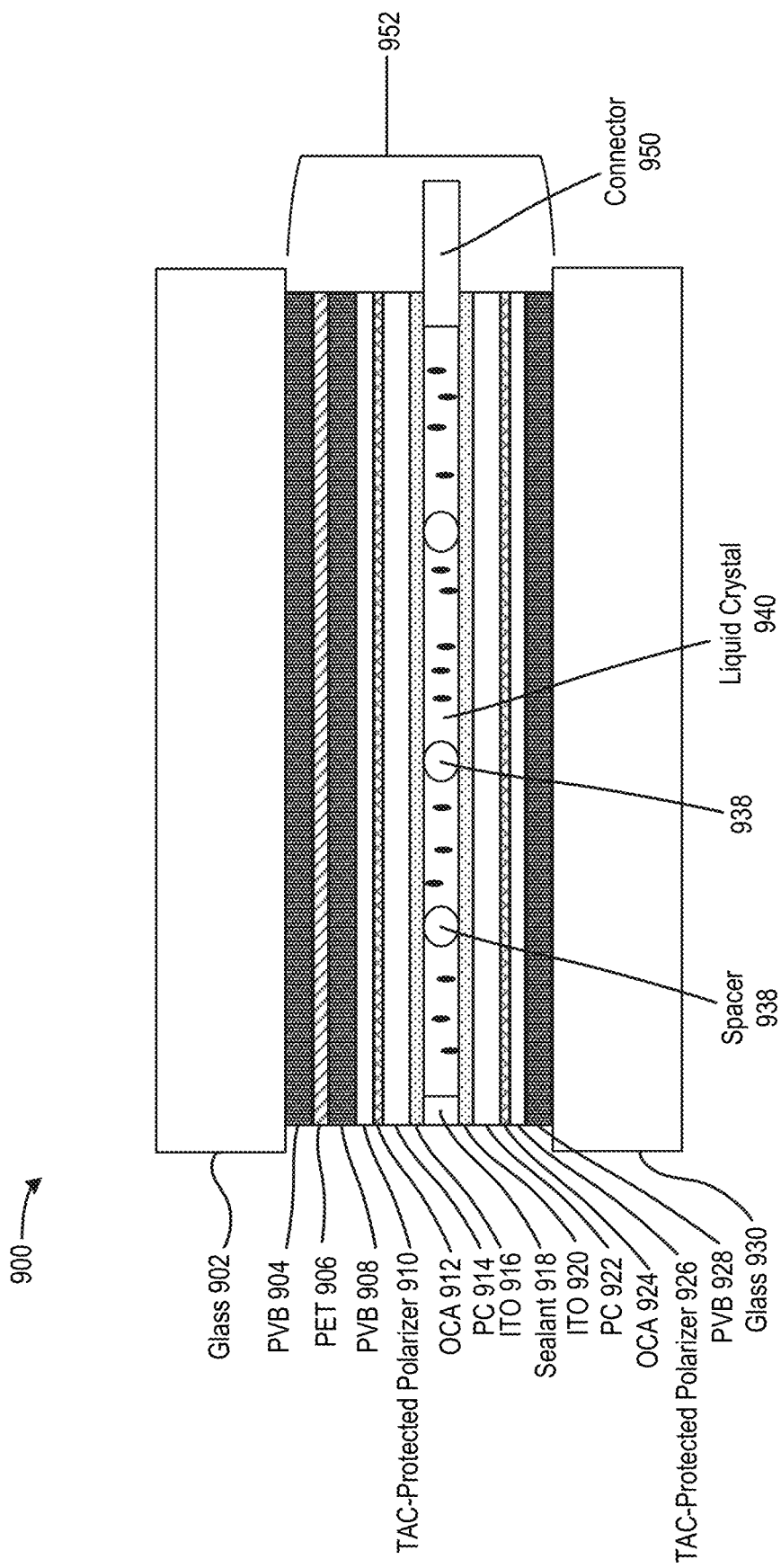
FIGS. 9A to 9C illustrate examples of LC assemblies that include PVB layers, according to certain embodiments.
Figure 9B:
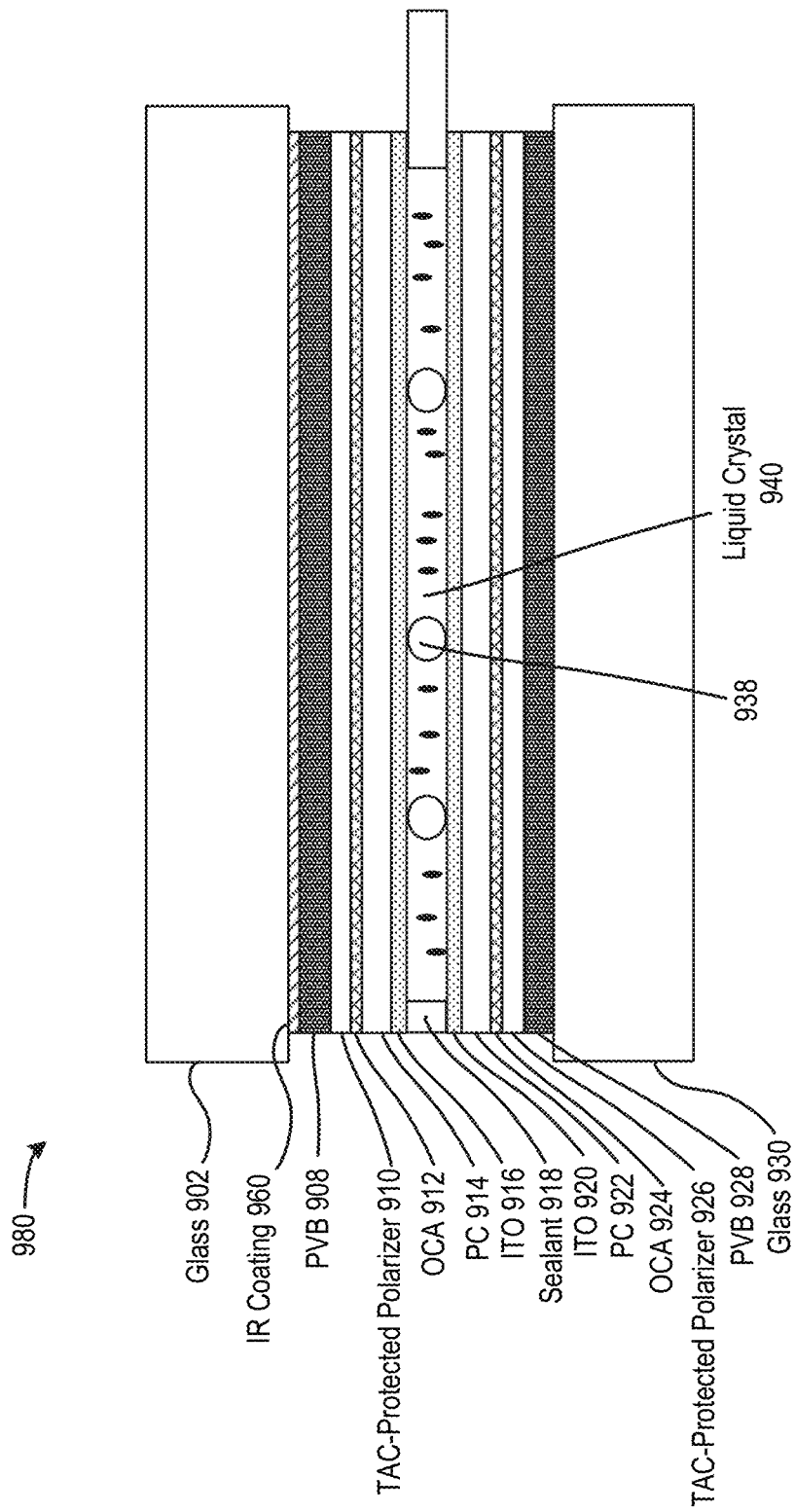
Figure 9C:
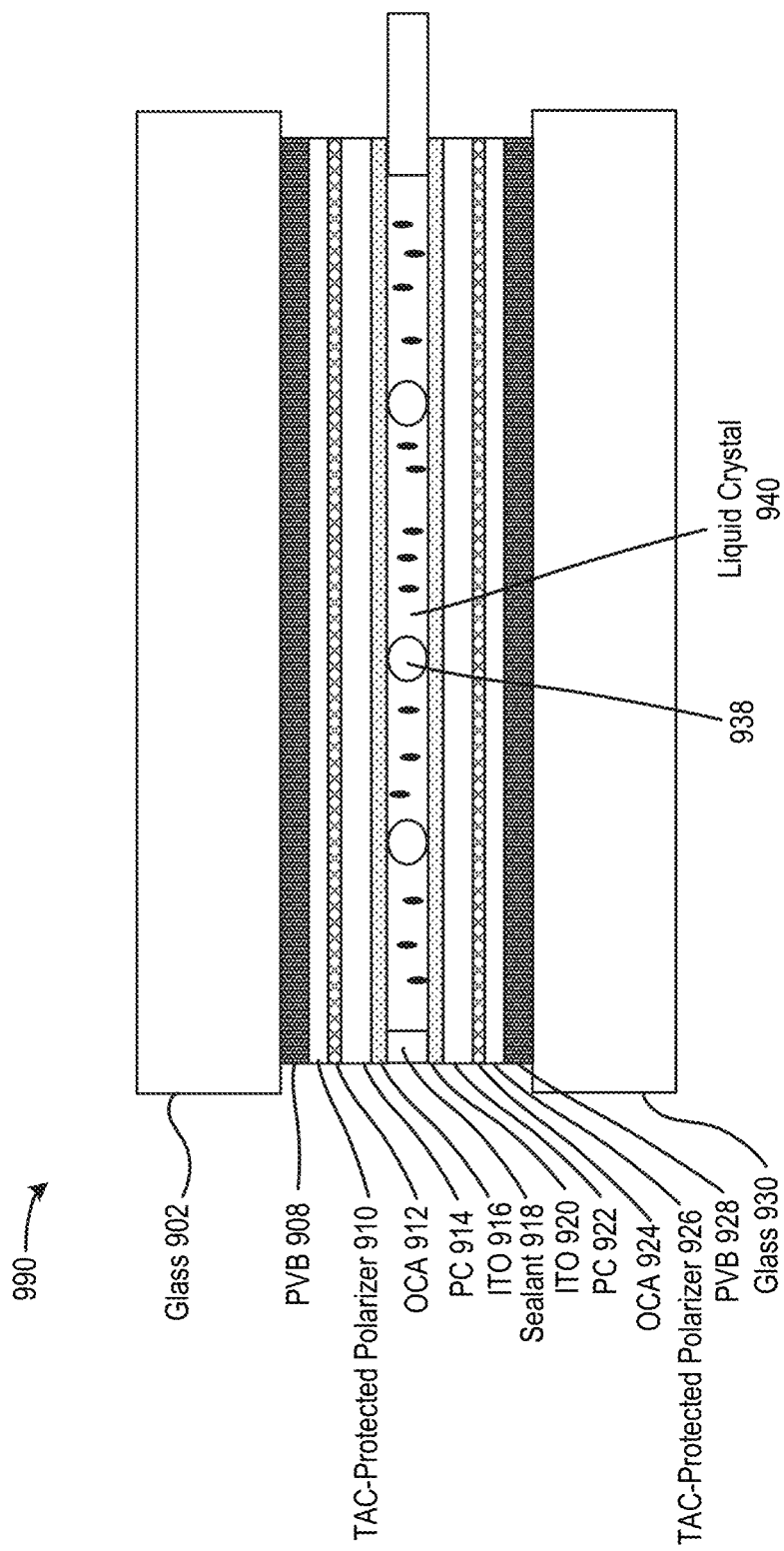

FIGS. 9A to 9C illustrate examples of LC assemblies that include PVB layers, according to certain embodiments. The LC assemblies depicted in FIGS. 9A to 9C can be formed as laminated structures using appropriate levels of heat and pressure. In FIG. 9A, an LC assembly 900 includes, from top to bottom, a first glass layer 902, a first PVB layer 904, a PET layer 906, a second PVB layer 908, a first TAC-protected polarizer 910, a first optical clear adhesive (OCA) layer 912, a first PC layer 914, a first ITO layer 916, a second ITO layer 920, a second PC layer 922, a second OCA layer 924, a second TAC-protected polarizer 926, a third PVB layer 928, and a second glass layer 930.

Example thicknesses of some of the above-mentioned components when the LC assembly 900 is configured for use as an automotive sunroof (total thickness approximately 6,100 $\mu$m) are as follows:

Glass layers 902 and 930: 2 millimeters (mm) each,
PVB layers 904, 908, and 928: 380 $\mu$m each,
PET layer 906: 105 $\mu$m,
TAC-protected polarizers 910 and 926: 170 $\mu$m each,
OCA layers 912 and 924: 50 $\mu$m each,
PC layers 914 and 922: 105 $\mu$m each,
Sealant 918 (same as liquid crystal 940): 9 to 15 $\mu$m, and
ITO layers 916 and 920: 4 $\mu$m each.

TAC-protected polarizers 910, 926 may each include a polarizer plate protected by one or more TAC layers. Thus, although shown as a single layer, each of the TAC-protected polarizers 910, 926 may correspond to a laminated structure comprising a polarizer plate plus a TAC layer on at least one surface of the polarizer plate. Polarizer plates are susceptible to damage from handling. Applying TAC to a polarizer plate helps to prevent such damage and to isolate the polarizer plate against environmental influences. Further, in some embodiments, a polarizer may include a UV blocking material. For instance, a TAC-protected polarizer may include the following layers in order: a first TAC layer, a polarizer plate, a second TAC layer, and a UV protective coating that filters out UV light. Alternatively, the UV blocking material could be incorporated into a TAC layer, e.g., as an additive.

LC assembly 900 further includes spacers 938, liquid crystal 940, and an electrical connector 950. Spacers 938 may correspond to the spacers 708 in FIG. 7A. Liquid crystal 940 may correspond to one of the configurations of liquid crystal 714 in FIGS. 7A to 7C (e.g., TN or GH liquid crystal). Connector 950 is configured to transmit signals to a pair of electrodes which, in FIG. 9A, correspond to the ITO layers 916 and 920. An electrical field can be established through the signals transmitted by the connector 950, which may be connected via a cable to a control unit (e.g., control unit 600 in FIG. 6). Additionally, LC assembly 900 may include a circumferential seal (not depicted) that operates a cushion against the glass layers 902 and 930, as described above in reference to FIG. 7A. The circumferential seal can be located at area 952 and may wrap around a perimeter of the LC assembly 900.

PET layer 906 corresponds to a flexible substrate and may include IR protection. For instance, PET layer 906 can be formed with IR blocking additives or coated with a layer of IR blocking material. IR blocking may be useful in automotive applications, especially sunroofs, because blocking IR radiation helps to avoid overheating. In some embodiments, the PET layer 906 may be replaced with a different flexible material (e.g., PC or TAC), which can also have IR protection. For applications where IR protection is unnecessary, IR protection can be omitted to avoid reduced light transmittance.

OCA layers 912 and 924 can be formed of a transparent adhesive. In some embodiments, the OCA layers 912 and 924 are formed using a liquid OCA (LOCA) that is sprayed onto the PC layers 914, 922 and/or the TAC-protected polarizers 910, 926 in preparation for lamination.

PC layer 914 and/or PC layer 922 can be formed of a flexible polycarbonate and may correspond to the substrates 702 and 712. Thus, PC layers 914, 922 and PET layer 906 may be formed as flexible films. ITO layer 916 and ITO layer 920 correspond to conductive layers on the substrates that form the PC layer 914 and the PC layer 922, respectively. Together with the ITO layers 916, 920, the PC layers 914, 922 define the walls of an LC cell filled with liquid crystal 940. The LC cell is laminated or bonded to the glass layers 902, 930. Although the glass layers 902, 930 are shown as flat, in actually the glass layers 902, 930 may not be perfectly equidistant at all points along their surfaces (this may also be true when the glass layer 902 and the glass layer 930 are designed to have the same curvature). To compensate for such defects, the PVB layers 904, 908, and 928 can be heated to melting, thereby covering the defects (gap filling) and solidifying into a uniformly thick adhesive that holds the layers adjacent to the PVB layers 904, 908, and 928 together. This would help avoid uneven distribution of pressure when the constituent layers of the LC assembly 900 are subjected to pressure during the lamination process. In some embodiments, PVB layers 904, 908, and 928 may be substituted with a different adhesive/plastic such as ethyl vinyl acetate (EVA), PET, an acrylic, an epoxy, a silicone-based adhesive, or some other optically clear adhesive (e.g., the same material as OCA layer 912 or OCA layer 924). Further, in some embodiments, one or more TAC layers, such as the TAC portions of the TAC-protected polarizers 910 and 926, may be formed as flexible substrates. Thus, a flexible LC assembly can include one or more flexible layers, where the one or more flexible layers are of the same or different materials.

FIG. 9B shows an LC assembly 980 according to an embodiment. Like elements are labeled with the same reference numerals as in FIG. 9A. In the embodiment of FIG. 9B, the PVB layer 904 and the PET layer 906 are replaced by an IR coating 960 that operates as an IR filter. The IR coating 960 can be formed by sputtering an IR blocking material onto the glass layer 902.

FIG. 9C shows an LC assembly 990 according to an embodiment. Like elements are labeled with the same reference numerals as in FIG. 9A. In the embodiment of FIG. 9C, no IR protective components are provided. For example, the LC assembly 990 does not include the PET layer 906 of FIG. 9A or the IR coating 960 of FIG. 9B.

Example thicknesses of some of the above-mentioned components when the LC assembly 990 is configured for use as an automotive side window (total thickness approximately 5,600 µm) are as follows:
Glass layers 902 and 930: 2 mm each,
PVB layer 908: 380 µm,
TAC-protected polarizers 910 and 926: 170 µm each,
OCA layers 912 and 924: 50 µm each,
PC layers 914 and 922: 105 µm each,
Sealant 918 (same as liquid crystal 940): 9 to 15 µm, and
ITO layers 916 and 920: 4 µm each.

As discussed above, flexible LC assemblies are advantageous, especially when used in conjunction with curved rigid substrates (e.g., a curved automotive window). However, flexible LC assemblies are sensitive to uneven pressure distribution and shear stress. Techniques for uniformly distributing pressure or stress during lamination would therefore be helpful to avoid damage to a flexible LC assembly. As mentioned above, melting PVB or some other adhesive to fill gaps between surfaces is one way to ensure even pressure distribution.

Another challenge with flexible LC assemblies is the temperature dependent behavior of a flexible substrate (e.g., a PC/PET/TAC substrate), a liquid crystal, and a rigid substrate (e.g., glass). All three may have different coefficients of thermal expansion. For example, the expansion coefficient of a flexible substrate may be higher than the expansion coefficient of a glass panel (e.g., two glass panels that form the outermost layers of an LC assembly, where an LC cell having the flexible substrate is laminated in between the glass panels). In addition, the liquid crystal may have a higher expansion coefficient than the flexible substrate which, as described above, can be used to define a wall of an LC cell. Accordingly, when subjected to temperature changes such as warming an LC assembly in an oven as part of a lamination process, the liquid crystal may undergo greater expansion compared to the flexible substrate due to having a higher expansion coefficient, leading to damage. Temperature changes can also occur outside of manufacturing. For example, homologation tests for car windows include temperature shock tests, where the temperature is changed, e.g., from 70° C. or higher to −20° C. or lower, within a very short time frame, e.g. 1 minute. This rapid change in temperature can produce high stress on any number of components in the LC assembly or associated with the LC assembly, e.g., cracking of an adhesive, a flexible substrate, or a frame housing the LC assembly. In order to address the problem of different thermal expansion between different layers, a lamination setup is provided in some embodiments. The lamination setup includes one or more adhesives which have the capability to be sufficiently rigid while at the same time being flexible enough to allow for thermal expansion without getting destroyed over many thermal expansion cycles (e.g., hundreds of thousands of cycles).

Further, as indicated above, PVB based processes applied to safety glass in the automotive industry traditionally require high temperatures (~and high pressure (~12 to 15 bar). Such temperatures and pressures are usually damaging LC assemblies (e.g., to spacers and to polarizer layers). In order to prevent damage to LC assemblies, the maximum temperature and maximum pressure to the which LC assembly is subjected during manufacture can be limited. The maximum temperature to which an LC assembly is subjected can be limited to approximately 100 to 160° C. (preferably between 110 to 120° C.). The maximum pressure can be set to and approximately 1 to 4 bars, can be also range between 140° C.) 10 to 15 bars when using mechanically applied pressure.

In certain embodiments, techniques are provided for enabling an LC assembly including PVB, for example, the LC assemblies depicted in FIGS. 9A to 9C, to be laminated successfully. The techniques include environment-side solutions implemented via controlling the environment in which lamination/bonding is performed and LC side solutions implemented via appropriate design of the LC assembly and its constituent components.

In some embodiments, spacers (e.g., spacers 938) are formed of a high temperature resistant material. Additionally, or alternatively, spacers can form with a geometry that resists high pressure. For instance, instead of forming spacers 938 as spheres, the spacers 938 can be formed as rectangular blocks, cylinders, or some other geometric shape that is more resistant to deformation. As an example, in FIG. 9A, the spacers 938 could be replaced with plastic cylinders (e.g., circular or elliptic cylinders) whose bases contact the ITO layers 916, 920. Besides spacers, other components of an LC assembly, such as polarizers, can be formed of high temperature resistant materials to ensure that the LC assembly survives the lamination process.

In some embodiments, a spacer and/or a layer that contacts the spacer is coated to make a substrate more resistant to damage caused by applying high pressure, e.g., penetration of the substrate by the spacer. For instance, the spacers 938 and/or the ITO layers 916, 920 could be coated with a transparent substance that has a greater hardness than the PC layers 914, 922. Alternatively, the material of the spacer and/or layer that contacts the spacer can be subjected to a tempering process to strengthen the material.

Figure 10:
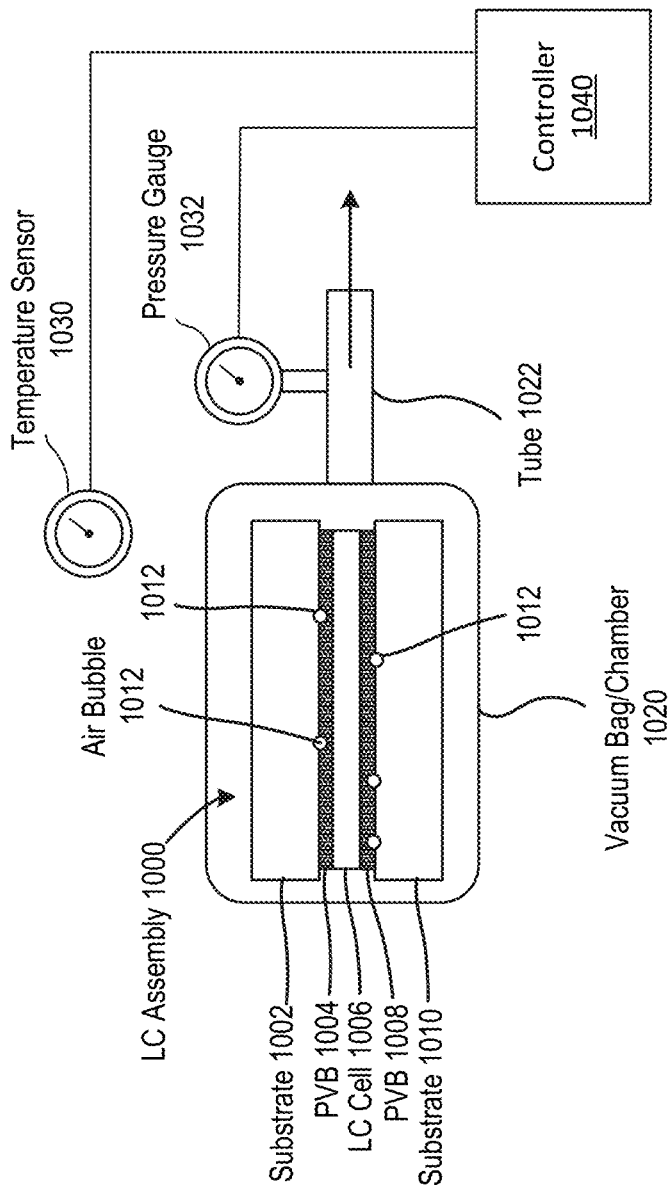
FIG. 10 shows an example of a method for laminating an LC assembly that includes PVB, according to certain embodiments.

FIG. 10 shows an example of a method for laminating an LC assembly 1000 that includes PVB, according certain embodiments. In FIG. 10, lamination of LC assembly 1000 involves applying heat and pressure while the LC assembly 1000 is located inside a vacuum bag or chamber 1020. The LC assembly 1000 shown in FIG. 10 is a simplified representation of an LC assembly and is shown as including a first substrate 1002, a first PVB layer 1004 between the first substrate 1002 and an LC cell 1006, a second substrate 1010, and a second PVB layer 1008 between the LC cell 1006 and the second substrate 1010. However, LC assembly 1000 can represent any PVB-containing LC assembly. LC cell 1006 can include any of the liquid crystals described herein, such as TN liquid crystal without or without a chiral dopant, GH liquid crystal, or VA liquid crystal.

An objective of the lamination process is to form a stacked multi-layered structure in which the layers of the stack are held securely together with minimal air bubbles or gaps between layers. FIG. 10 shows air bubbles 1012 between substrate 1002 and PVB layer 1004 and between substrate 1010 and PVB layer 1008. As discussed above, such air bubbles are formed due to variation in the height of the surface of a substrate. Applying pressure forces the air bubbles out, and such pressure is traditionally applied mechanically, for example, by clamping the layers together using relatively high pressure. Accordingly, in some embodiments, mechanical pressure is applied to force air out of the multi-layered structure (e.g., from the center toward the outer edges of the multi-layered structure). However, a vacuum chamber or bag, as shown in the embodiment of FIG. 10, allows for removal of air bubbles using lower pressure. Accordingly, as shown in FIG. 10, mechanical pressure can be replaced by atmospheric pressure generated using a vacuum environment.

PVB layer 1004 and PVB layer 1008 correspond to adhesive layers that bond the substrates 1002 and 1010 to the LC cell 1006. The PVB layer 1004, the PVB layer 1008, the substrate 1002, and/or the substrate 1010 may be configured to allow air to escape when pressure is applied. For example, the surface of the PVB layer 1008 that is in contact with the substrate 1002 can include channels that allow air movement, with the channels being eliminated via melting of the PVB layer 1008. Similarly, substrate 1002 can include channels that are filled in by the melted material of the PVB layer 1004. FIG. 10 is merely an example intended to illustrate a lamination process for forming an LC assembly using a stack of layers. In some implementations, PVB layers 1004 and 1008 can be replaced with another material that melts to adhere two layers together, for example the same OCA material as the OCA layers 912 and 924 in FIG. 9A.

The vacuum environment provided by the vacuum bag/chamber 1020 removes air bubbles 1012. Vacuum bag/chamber 1020 also enables lamination to be performed at a lower pressure and lower pressure. For example, if the LC assembly 1000 is placed inside a vacuum chamber, the pressure can be set to around 1 to 2 bars (1 bar equals 100,000 Pascals) and the temperature around 110° C. (the vacuum chamber may also function as a convection oven or autoclave) to cause the PVB layers 1004, 1008 to melt. Depending on how much melting of the PVB layers is desired (e.g., entirely melted versus melting up to a certain depth), the temperature of around 110° C. can be maintained for a set duration. Upon cooling, the PVB layers 1004, 1008 will re-solidify and the entire LC assembly 1000 can then be removed from the vacuum chamber. Temperature and pressure inside the vacuum bag/chamber 1020 can be monitored using a temperature sensor 1030 and a pressure gauge 1032. The temperature and pressure can be set by a controller 1040 coupled to the temperature sensor 1030 and the pressure gauge 1032.

In comparison to vacuum chambers, vacuum bags are less costly to set up and operate, but generally require higher temperature and pressure compared to vacuum chambers. For example, to laminate the LC assembly 1000 using a vacuum bag, air can be extracted from the vacuum bag through a tube 1022 until a pressure of around 3 to 4 bars is reached. At a pressure of 3 to 4 bars, the LC assembly 1000 can be heated to around 120° C. (e.g., by placing the vacuum bag inside an oven) to cause the PVB layers 1004, 1008 to melt. The vacuum bag itself can be formed of a heat resistant material so that the vacuum bag can be reused. Accordingly, the pressure can be set to between 1 to 4 bars, with a higher pressure typically being set when using a vacuum bag than when using a vacuum chamber.

As illustrated in FIGS. 9A to 9C, a PC layer (914, 922) can form a substrate defining a wall of an LC cell. More specifically, boundaries of the LC cell can be defined by a pair of substrates and a sealant. Traditional LC cells are sandwich structures comprising liquid crystal between two glass substrates. Replacing glass with PC improves the impact resistance of the LC assembly and enables a certain degree of flex as compared to glass, which is rigid, but without sacrificing transparency or optical clarity. In general, any glass layer of an LC assembly can be replaced with a PC layer. For example, PC could replace the glass layer 902 and/or the glass layer 930. PC layers are not limited to LC assemblies that are formed integrally with a window and can also be included in LC assemblies designed to be attached to windows.

When used as an outermost layer (e.g., in place of glass layer 902 or glass layer 930), a surface of the PC layer can be coated with a scratch resistant material to protect against abrasion, since PC is softer than glass. Because of its impact resistance and ability to be formed in many different shapes, an LC assembly with one or more PC layers is suitable for use in an automotive window, e.g., a side window. PC is also lighter than glass and can therefore reduce the overall weight of an automobile. For instance, switching to PC windows may reduce the overall weight by about 50 pounds, which can lead to increased fuel/battery economy.

Figure 11:
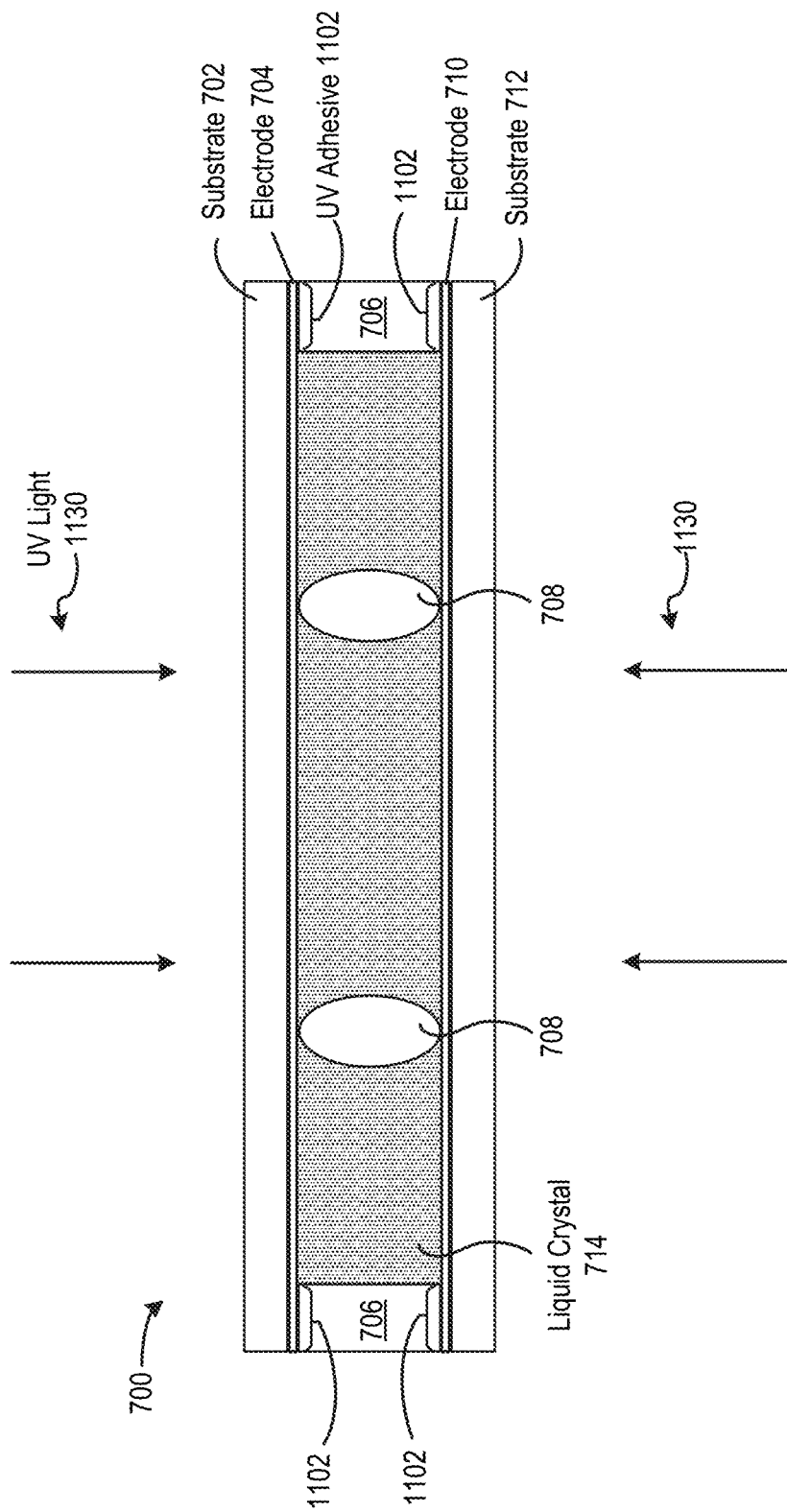
FIG. 11 shows a UV curing step applied to an LC cell.

FIG. 11 shows a UV curing step applied to the LC cell 700 from FIG. 7A. In FIG. 11, UV light 1130 is applied to both sides of the LC cell 700 to be incident upon the outer surfaces of substrates 702, 712. In some implementations, only one side of an LC cell is illuminated, and this may be sufficient for the UV light to pass through to the other side of the LC cell. When the UV light 1130 enters the LC cell, the UV light cures UV adhesive 1102 applied to substrate-facing surfaces of sealant 706. Once the adhesives 1102 are cured, the substrates 702, 712 become fixedly attached to the sealant 706.

If the substrates 702, 712 were replaced with a UV blocking material, the UV light 1130 would not be able to reach the adhesive 1102, or the UV light 1130 would be blocked to such extent that the portion of UV light 1130 that penetrates through the UV block material would be insufficient to fully cure the adhesive 1102. Similarly, if one or more UV blocking layers are introduced between the outermost surface of an LC assembly and a layer containing UV adhesive, the UV adhesive would not be able to be cured using UV light.

UV based adhesives are often used in the automotive industry. One benefit of UV adhesive is that parts which are to be glued together by the UV adhesive can be repositioned any time prior to application of UV light. If the parts are misaligned or placed incorrectly, they can easily be moved before curing. However, as explained above, UV adhesives are incompatible with UV blocking materials. Further, some types of LC assemblies depend upon the use of one or more UV blocking materials. For instance, in a TN LC cell such as shown in FIG. 7B, polarizers are used to control the direction of the light that enters or exits the liquid crystal. As discussed above in connection with FIG. 9A, polarizers are often protected using TAC and can also include a UV protective coating. Therefore, UV curing may not be possible for a TN LC cell or other LC cell containing a polarizer.

As discussed above, for example with respect to the V-T curve in FIG. 8A, TN LC cells have several advantages that can potentially make TN LC cells better suited for certain types of applications. For instance, it can be seen from comparing FIG. 8A to FIG. 8B that the TN configuration of FIG. 8A has a lower minimum transmittance than the GH configuration of FIG. 8B. Thus, TN LC cells can be used in situations where a greater degree of darkness is desired.

Figure 12A:
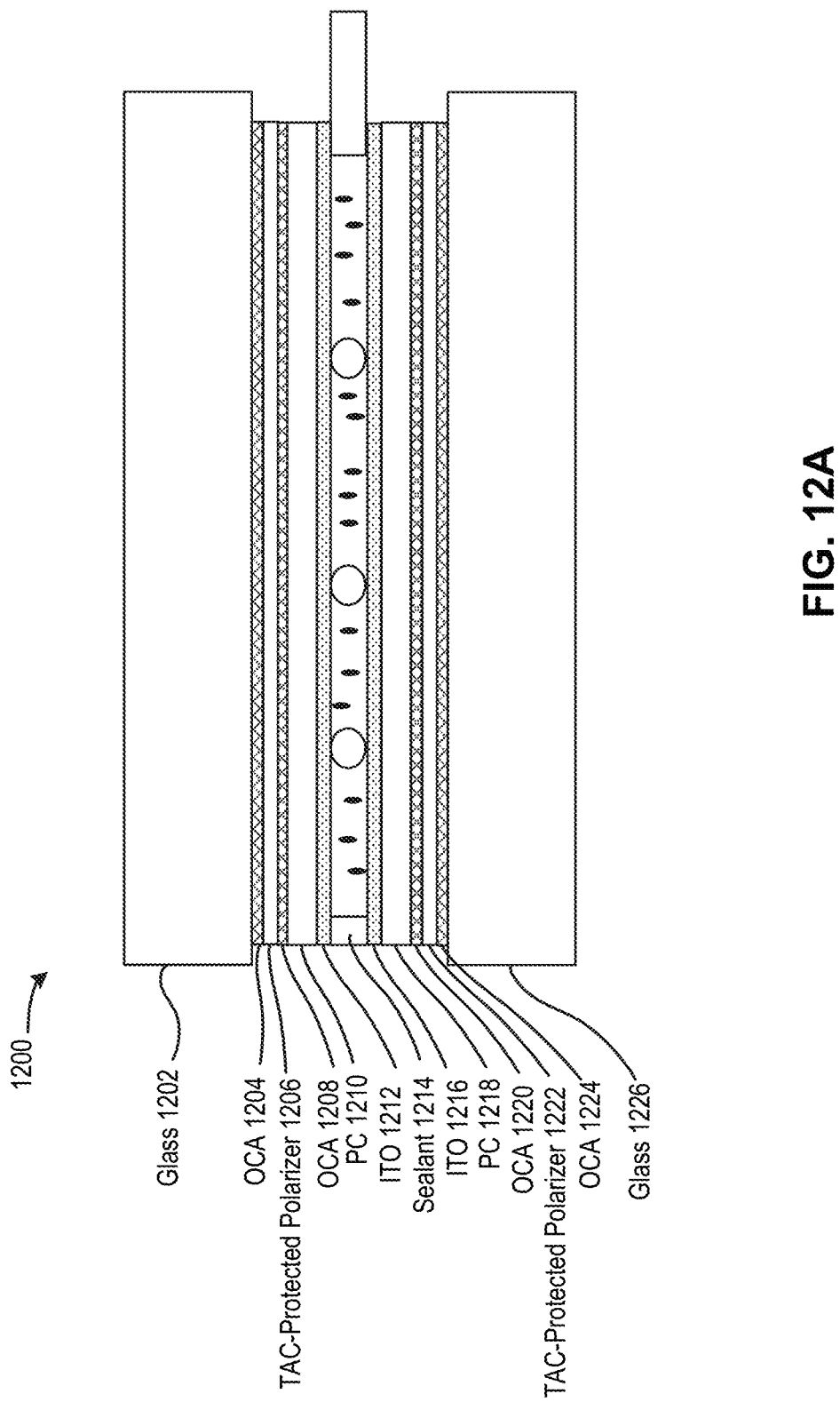
FIGS. 12A and 12B illustrate examples of LC assemblies that include indium tin oxide (ITO) electrodes and polarizers with cellulose triacetate (TAC), according to certain embodiments.
Figure 12B:
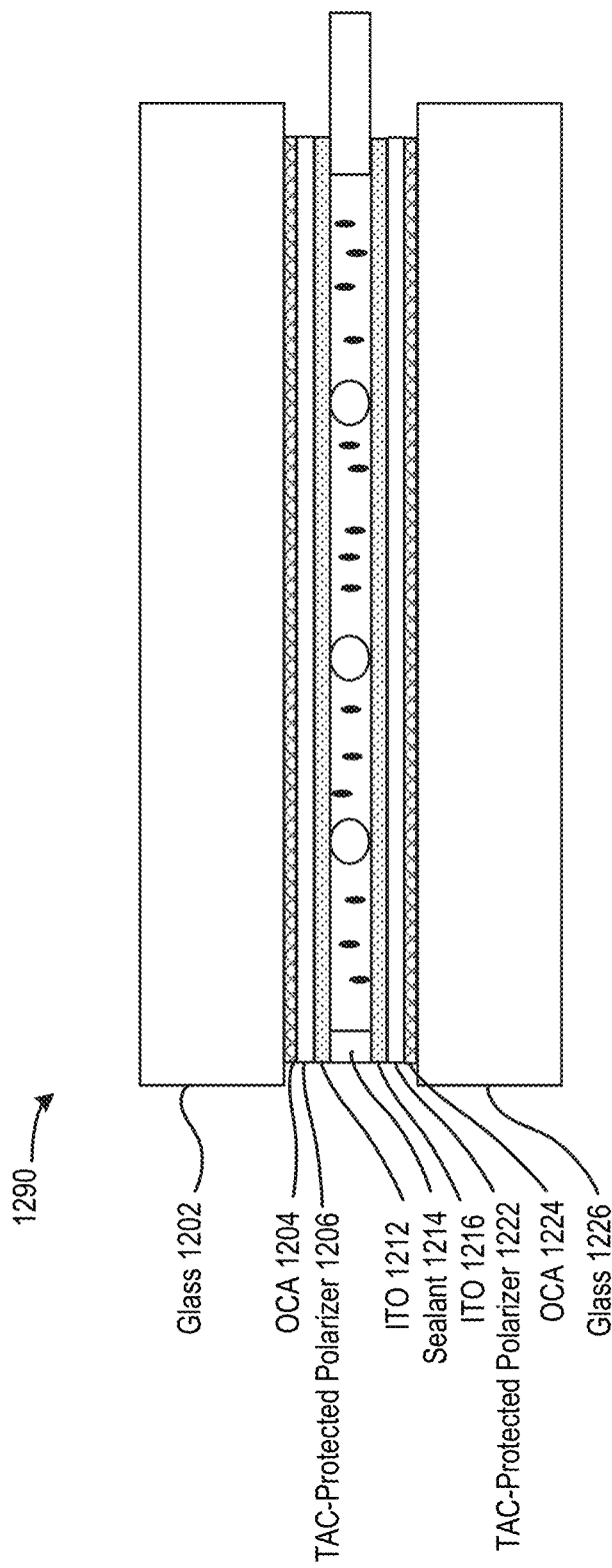

Because of the UV blocking properties of the UV protective coating that is usually included in a TAC-protected polarizer, such polarizers have not been used in combination with LC components that have traditionally been glued using a UV adhesive. For example, the electrodes 704, 710 in FIG. 11 may be formed using ITO or some other material that is amenable to bonding with UV adhesive. Therefore, no LC assemblies featuring a TAC-protected polarizer in combination with an ITO-based electrode have been made in the past. FIGS. 12A and 12B show examples of other LC assemblies that feature a TAC-protected polarizer in combination with an ITO-based electrode.

FIG. 12A shows an LC assembly 1200 according to an embodiment. The LC assembly 1200 includes, from top to bottom, a first glass layer 1202, a first OCA layer 1204, a first TAC-protected polarizer 1206, a second OCA layer 1208, a first PC layer 1210, a first ITO layer 1212, a sealant 1214, a second ITO layer 1216, a second PC layer 1218, a third OCA layer 1220, a second TAC-protected polarizer 1222, a fourth OCA layer 1224, and a glass layer 1226.

In FIG. 12A, the TAC-protected polarizer 1206 is bonded to glass layer 1202 via OCA layer 1204 and to PC layer via OCA layer 1208. Similarly, the TAC-protected polarizer 1222 is bonded to glass layer 1226 via OCA layer 1224 and to PC layer 1218 via OCA layer 1220. Each of the OCA layers shown in FIG. 12A can be a liquid OCA. Further, the TAC-protected polarizers 1206 and 1222 may each include a UV protective coating.

The ITO layers 1212, 1216 correspond to electrodes. However, an electrode of an LC assembly according to an embodiment described herein can be formed of another electrically conductive material, for example, graphene.

FIG. 12B shows an LC assembly 1290 according to an embodiment. The LC assembly 1290 includes similar elements as the LC assembly 1200 in FIG. 12A but omits PC layers 1210 and 1218. In the absence of these PC layers, the TAC-protected polarizers 1206 and 1222 are directly attached to ITO layers 1212 and 1216, respectively. Thus, in some embodiments, an ITO layer can be formed directly on a TAC-protected polarizer or any other layer that includes TAC. For example, ITO layer 1212 can be sputtered directly onto a surface of a TAC portion of the TAC-protected polarizer 1206.

In order to enable an LC assembly to include a UV blocking component such as a TAC-protected polarizer, aspects of the present disclosure are directed to alternatives for UV adhesives. In particular, embodiments relate to the use of non-UV cured adhesives such as epoxies and heat-activated adhesives. For instance, adhesive 1102 in FIG. 11 can be replaced with a two-part epoxy that has relatively long working time. The working time of the epoxy can, for example, be several minutes long since this is generally sufficient to prepare an LC assembly for lamination yet allows a small-time window in which to reposition parts as needed. Alternatively, a heat-activated adhesive that cures at or below the temperature of the lamination process can be used.

Figure 13:
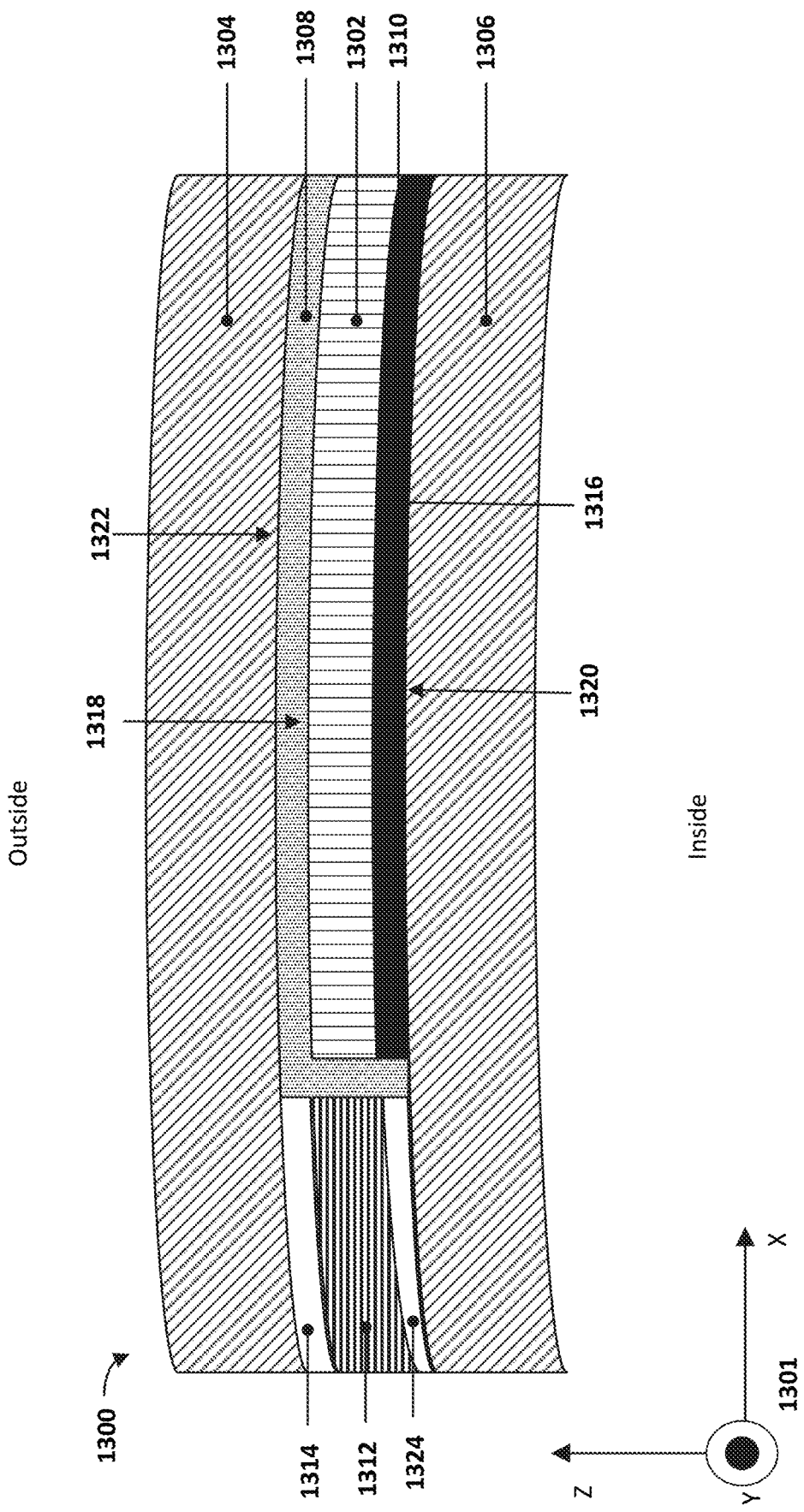
FIG. 13 shows an example LC assembly that includes two different types of adhesives.

FIG. 13 shows a LC assembly 1300 having a LC panel 1302 sandwiched between a first glass panel 1304 and a second glass panel 1306. In the embodiment shown, the LC assembly 1300 is a curved LC assembly. Each of the panels, the LC panel 1302, the first glass panel 1304, and the second glass panel 1306 has a curved shape. The LC panel may comprise a multi-layer, flexible film structure. In some embodiments, the LC panel comprises an LC cell as described herein. This flexibility may allow the LC panel to conform to the curvature of the first glass panel 1304 and the second glass panel 1306. The curves of each panel are similar so that each panel may mate with the adjoining panels with minimal space between adjoining panels. The LC assembly 1300 may be used as dimmable windows. For example, the LC assembly may be used a windscreen, a rear windshield, a sunroof, or a side window for an automobile. When used for an automobile, the first glass panel 1304 may be the outer glass panel and the second glass panel 1306 may be the inner glass panel. The LC panel 1302 may be a dimmable LC panel. In one example, the LC panel 1302 may include a first substrate layer, an ITO layer, LC cells sealed by a sealant, a second ITO layer, and a second substrate layer. A TAC-protected polarizer layer may also be included as one or both of the first and second substrate layers or as an additional layer. In some embodiments, the LC panel 1302 may include a first substrate layer, an ITO layer, LC cells sealed by a sealant, a second ITO layer, and a second substrate layer.

The LC assembly 1300 also features a first adhesive 1308, a second adhesive 1310, a sealing block 1312, a first sealing adhesive layer 1314, and a second sealing adhesive layer 1324. In the embodiment shown, the second adhesive 1310 is a film adhesive and the first adhesive 1308 is a liquid adhesive. The film adhesive 1310 may be, for example, an acrylic-based adhesive, a silicon-based adhesive, or an epoxy adhesive. Similarly, the liquid adhesive 1308 may be acrylic-based adhesive, a silicon-based adhesive, or an epoxy-based adhesive. As shown, the sealing block 1312 may be located at an outer edge or perimeter region of the LC panel 1302, positioned between the first glass panel 1304 and the second glass panel 1306. In this manner, the sealing block 1312, the first glass panel 1304 and the second glass panel 1306 may serve to encase the LC panel 1302. For example, from a top-down view (e.g., viewed downward along the Z axis), the sealing block 1312 may surround the outer edge or perimeter region of the LC panel 1302. In some embodiments, it may be preferred that the sealing block 1312 has a coefficient of friction similar to a coefficient of friction for glass. In some embodiments, it may be preferred that the sealing block 1312 has a coefficient of friction less than the coefficient of friction for glass. As shown, the first sealing adhesive layer 1314 positioned between, and serves to attach, a first surface of the sealing block 1312 and the first glass panel 1304. The second sealing adhesive layer 1324 is positioned between, and serves to attach, a second surface of the sealing block 1312 and the second glass panel 1306. Note that FIG. 13 illustrates a left-side region of a cross-sectional view of the LC assembly 1300. A right-side region (not shown) of the cross-sectional view of the LC assembly 1300 may include the same components.

During manufacturing of the curved LC assembly 1300 such as an LC assembly for use as a side window for an automobile, the curve panels may present problems when mating the different layers together. A curved glass panel may have variations in the surface. The smaller the radius of the curve, the more frequent surface variations may appear on the panel. In the example of an automobile side window, the curve of the LC assembly 1300 may be stronger at the ends of the panel, thus there may be greater surface variations at the end of the panel. When a glass panel is mated to the LC panel 1302, the surface variations in the panel may cause air pockets and created uneven pressure on the LC panel. The uneven pressure to the LC panel 1302 may cause issues to the LC panel and LC assembly 1300, such as creating marks or streaks on the panel. To combat this problem, the LC assembly may use two different adhesives, a film adhesive for the second adhesive 1310 and a liquid adhesive for the first adhesive 1308.

Each of the three panels, the LC panel 1302, the first glass panel 1304 and the second glass panel 1308 should have mating surfaces with similar curve patterns, e.g. an inner surface 1316 of the LC panel should have the same curvature as an outer surface 1320 of the second glass panel and an outer surface 1318 of the LC panel should have the same curvature as the inner surface 1322 of the first glass panel. Despite having the same curvature, the glass surfaces may still have surface variations that do not match the surface of the LC panel 1302.

During manufacturing, the inner surface 1316 of the curved LC panel 1302 may be adhered to the outer surface 1320 of the second glass panel 1306 by the second adhesive 1310, a film adhesive. The two surfaces may not mate perfectly due to surface variations and thus air pockets may be formed. However, the LC panel 1302 may be flexible enough to fill in the surface variations and not allow no air pockets between the LC panel 1302 and the second glass panel 1306 creating a mini-assembly of the LC panel 1302 and the second glass panel 1306.

The inside surface 1322 of the curved first glass panel 1304 is mated to the outer surface 1318 of the LC panel 1302. The first adhesive 1308 is used, the adhesive is the liquid adhesive. Similar to the curved second glass panel, the inside surface 1322 of the first glass panel may have variations. Pockets may form when the first glass panel 1304 is mated to the LC panel 1302. When the LC panel 1302 is mated to the first glass panel 1304, the LC panel is already attached to the second glass panel 1306 and thus the LC panel-second glass panel assembly has the rigidity of glass and cannot flex to fill the voids created by the surface variations. To prevent air pockets from forming, the first adhesive 1308 may be a liquid adhesive. The liquid adhesive, generally speaking, has a higher viscosity then the film adhesive, and may fill in any air pockets created between the surface of the first glass panel 1304 and the surface of the LC panel 1302. The liquid adhesive allows the LC assembly 1300 to be formed with minimal to no air pockets, allowing for pressure to be minimal and evenly distributed across the LC panel.

As described above, the LC assembly 1300 may be subjected to large temperature changes. While in use, the LC assembly 1300 may be subjected to temperature ranges from −20 to 80° C. when in use, and as much as −40 to 120° C. when manufactured or stored. The LC assembly 1300 has the two glass panels with relatively low thermal coefficients compared to the thermal coefficient of the LC panel 1302. In some embodiments, the LC assembly 1300 may have a thermal coefficient 100 times greater than the thermal coefficient of either glass panel. Thus, when subjected to temperature changes, the LC panel 1302 may grow or shrink a larger amount compared to the glass panels. Due to the geometry of the LC panels, where the surface area of the panel is much greater than the thickness of the panel, the lateral growth may be large. For example, a side window of an automobile may have a height and width of 600 mm and a thickness of 0.5 mm, or 500 um. Therefore, the lateral growth of the LC panel in the direction of the panel height or width may be a few millimeters while growth in the thickness direction may be a few microns. In addition, lateral growth of the LC panel 1302 (growth in the X and Y direction as shown in the local axis 1301) with minimal growth in the glass panel may cause additional force on the LC panel. This additional force may cause optical deformities such as streaks or marks. LC panel 1302 growth in towards the glass (the z-direction) may be preferred, as the glass may be able to handle the minimal growth by the LC panel 1302 in this direction. In some embodiments this growth may be absorbed by the adhesive, such as the first adhesive 1308 and/or the second adhesive 1310. Therefore, thermal growth in thickness is desired over lateral growth across the panel.

The adhesive between the LC panel 1302 and the glass panels is used to control the direction of the growth. By having a strong second adhesive 1310, the film adhesive, between the LC panel 1302 and the second glass panel 1306, the LC panel lateral growth is constrained by the glass panel. The constrained growth causes the LC panel 1302 to grow in thickness (the Z direction) towards the glass panels. As discussed earlier, the growth in this direction is a few microns, and thus is easily handled by the glass panels without putting any undue force on the LC panel.

Figure 14:
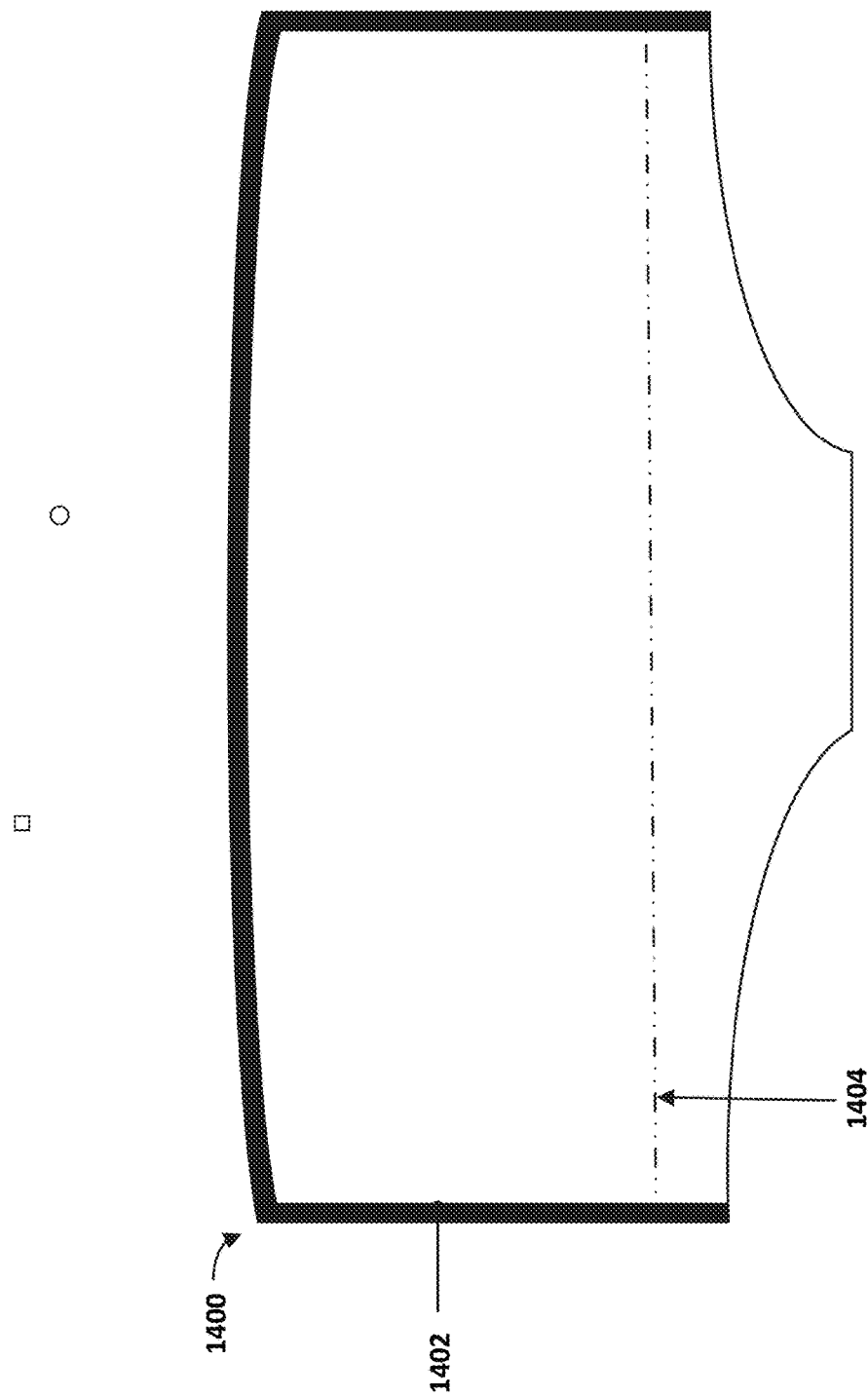
FIG. 14 shows an example of a LC assembly as a side window in an automobile with a covering around a visible edge of the side window.

The LC assemblies 1300 may have optical imperfections on the edges. These optical imperfections may include issues such as image distortion, optic reflection, and other optical defects. Shown in FIG. 14 is a LC assembly as a side window 1400 for an automobile with an edge covering strip 1402. The edge covering strip 1402 may be used to cover any optical imperfections on the edge. In the figure shown, the sideview window 1400 has a window line 1404, the line where the window is exposed when the window is fully in the "up" position. Everything above the window line 1404 may be seen by a person viewing the car, while everything below the line may be in the door panel and is not seen when the sideview window 1400 is installed into an automobile. In this example, the edge covering strip 1402 covers only edges of the sideview window 1400 that may be exposed to a viewer when the sideview window is installed in an automobile. The edge covering strip 1402 may also be used for a variety of windows including The edge covering strip 1402 shown is black. In another embodiment, the edge covering strip 1402 may be silver. The edge covering strip 1402 may be in any color desired, including a mirror like finish. In some embodiments, the edge covering strip 1402 may have a width greater of 10 mm or more. The width may be from a side window 1400 edge towards the interior of the side window. The width runs along an axis perpendicular to the sideview window 1400 edge where the width is measured. In other embodiments, the edge covering strip 1402 may have a width of 7 to 9 mm. In some embodiments, the edge covering strip 1402 may have a width of less than 6 mm. The smaller the edge, the greater the distribution of additional force may be in the localized area of the edge covering strip 1402. These additional forces may cause additional optical impurities in the LC assembly.

Figure 15:
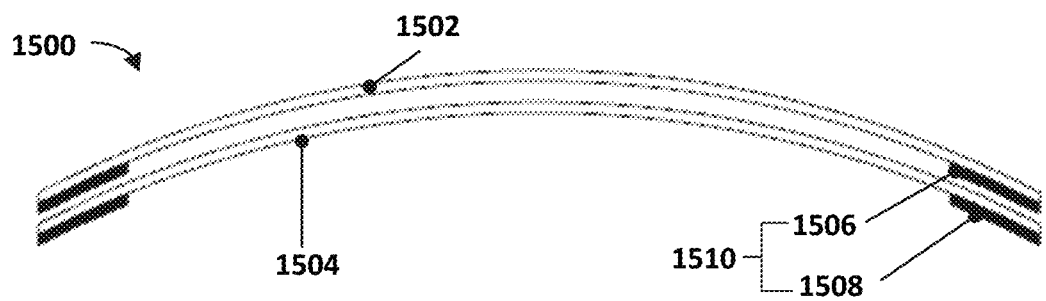
FIG. 15 shows an example of where cover strips may be placed in a LC assembly.
Figure 15:
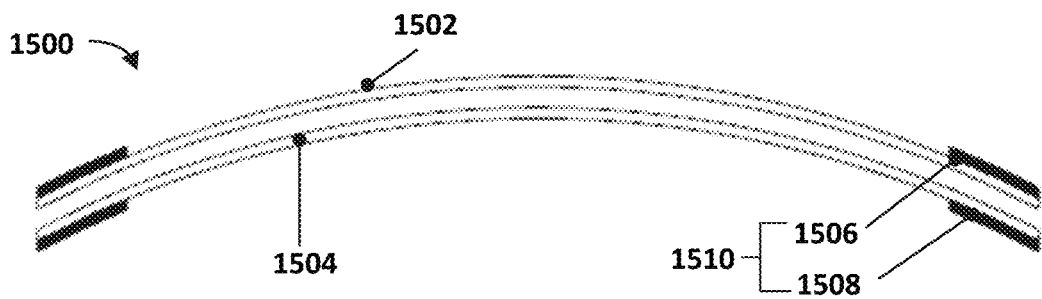

FIG. 15 shows two simplified cross sections of a LC assembly window panel 1500 with edge covering strips placed in two location. In each window panel 1500 there are two curved glass panels, an outside glass panel 1502 and an inside glass panel 1504. For ease of explanation, none of the components between the outer glass panel 1502 and inner glass panel 1504 are shown in this figure, but such components are understood to exist, e.g., as described in other sections of this disclosure. For example, there may be an LC panel and other components (not shown) between the two glass panels. Each figure shows the location of a first edge covering strip 1506 and a second edge covering strip 1508 which make an edge covering 1510 positioned at an outer edge region of the LC assembly.

In some embodiments, the edge covering 1510 has two edge covering strips on two surfaces of the window panel 1500. In one embodiment, the first edge covering strip 1506 is on the inside surface of the outer glass panel 1502. The second edge covering strip 1508 is on the inside surface of the inside glass panel 1504. Here, the first edge covering strip 1506 is between the two glass panels. It may, for example, be between an LC panel and the outside glass panel 1502. The location of the first edge covering strip 1506 may cause additional forces on the LC panel. Details are discussed below with reference to FIG. 16.

In another embodiment, the first edge strip 1506 is on the outside surface of the outer glass panel 1502. The second edge covering strip 1510 is on the inside surface of the inside glass panel 1504. In this embodiment, the two edge strips are on the outside of the LC assembly.

Figure 16:
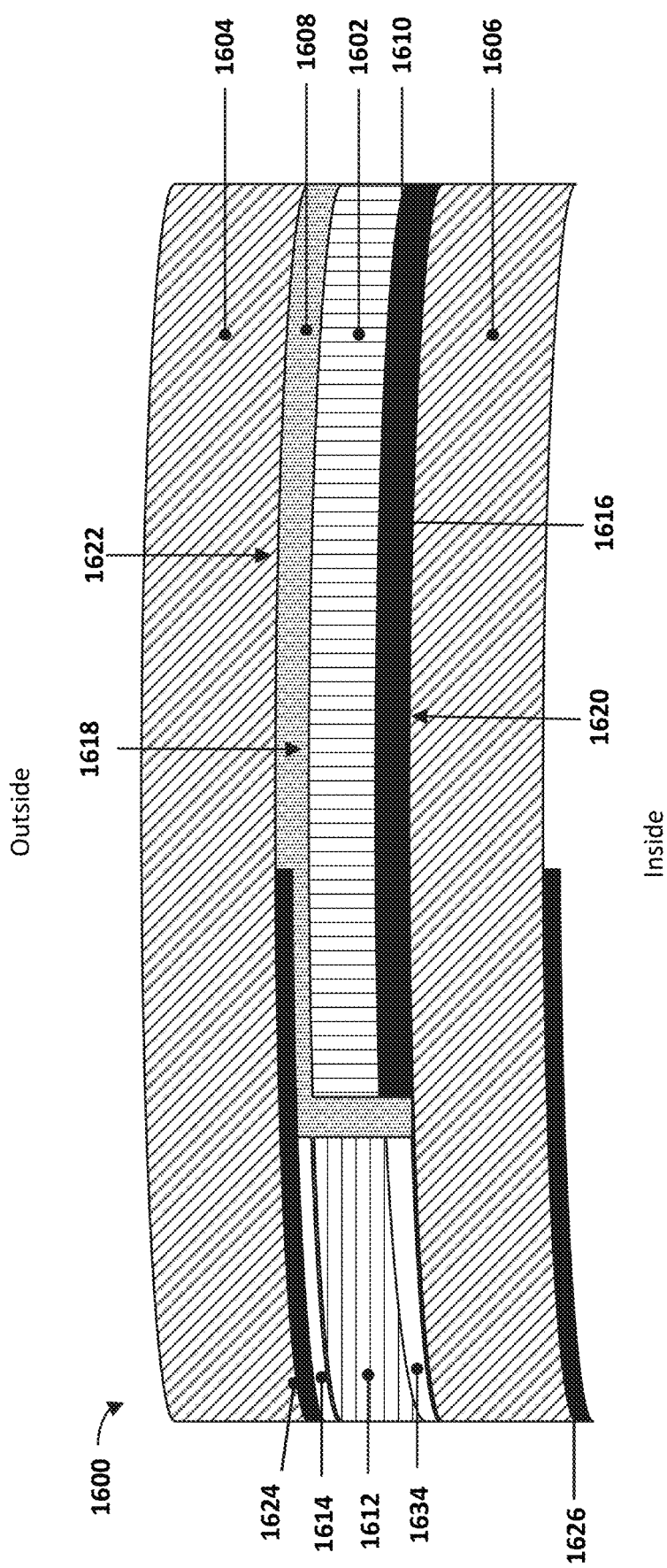
FIG. 16 shows an example LC assembly with cover strips.

FIG. 16 shows another example of a LC assembly 1600 similar to the LC assembly shown in FIG. 13. The LC assembly 1600 has a LC panel 1602 between a first glass panel (outside glass panel) 1604 and a second glass panel (inside glass panel) 1606. The LC assembly 1600 is a curved LC assembly. The LC panel 1602 may be a dimmable panel.

The LC assembly 1600 has a first adhesive 1608 that bonds the outside glass panel 1605 and the LC panel 1602. In the embodiment shown, the first adhesive 1608 is a liquid adhesive. The LC assembly 1600 has a second adhesive 1610 that bonds the inside glass panel 1606 and the LC panel 1602. The second adhesive 1610 may be a film adhesive or a liquid adhesive. On the outside of the LC panel 1602 towards the panel edge, there may be a sealing block 1612. The sealing block 1602 may be between the outside glass panel 1604 and the inside glass panel 1606. The sealing block 1602, in some embodiments, may have the same coefficient of friction as the glass panels. The sealing block 1602 may be attached by a first sealing adhesive layer 1614 and a second sealing adhesive layer 1634. The LC assembly also has a first edge covering strip 1624 and a second edge covering strip 1626. The two edge covering strips make an edge covering, positioned at an edge region of the LC assembly. The edge covering may be used to hide optical imperfections in the LC assembly 1600 along the edge.

The first edge covering strip 1624 is located along an inside surface 1622 of the outside glass panel 1604 and may be in contact with the first adhesive 1608. This additional material within a LC assembly stack may add additional force on the LC panel 1602, particularly on the LC panel edge. This may lead to additional marks or streaks across the LC assembly. When the edge covering strips, in particular the first edge covering strip 1624, is wider, such as an edge covering strip with a width that is greater than 12 mm, the force is absorbed by a larger area and there is less likely to be additional localized force on the LC panel 1602. Having a wider edge covering strip 1624 is less likely to lead to marks on the LC assembly 1600. When a narrower edge covering strip is used, such as an edge covering strip with a length of 9 mm or less, there may be a larger localized force on the edge. In the embodiment shown, the edge covering strip 1624 may cover both the sealing block 1612 and a part, such as an edge, of the liquid crystal panel 1602. In some embodiments, the edge covering strip 1624 may cover a width of 2 or less mm of the liquid crystal panel 1602 starting from the edge of the liquid crystal panel 1602. In some embodiments, the edge covering strip 1624 may cover 2 mm to 7 mm of the liquid crystal panel 1602 starting from the edge of the liquid crystal panel. In some embodiments, the edge covering strip 1624 may cover 8 mm to 13 mm of the liquid crystal layer 1602 starting from the edge of the liquid crystal panel. Still, in some other embodiments, the edge covering strip 1624 may cover only the sealing block 1612 and not the liquid crystal panel 1602. In some embodiments, the edge covering strip 1624 may have a width of 5-11 mm. In some embodiments, the edge covering strip 1624 may have a width of 7-9 mm.

In the case of the first edge covering strip 1624 is a shorter edge covering strip, a covering strip print less than 9 mm, is in the area of the first adhesive 1608 between the inside surface 1622 of the first glass panel. The first adhesive is a liquid adhesive in this example. The liquid adhesive may be able to contour around the first edge covering strip 1624 reducing the force felt on the LC panel 1602 in the localized area. This reduction of force in the localized area reduces the chances of any optical marks or other deformities that may appear on the LC panel 1602 due to the shorter edge covering strip.

Figure 17:
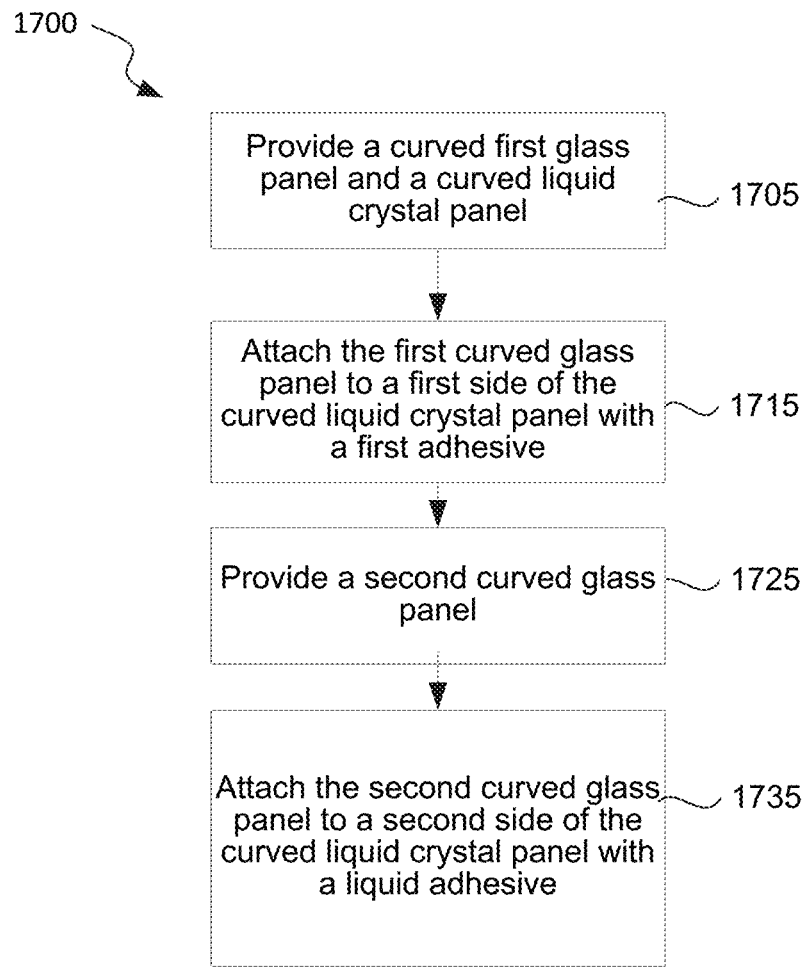
FIG. 17 is a diagram for making a curved LC assembly.

FIG. 17 shows a process for making a curved LC assembly. In process step 1705, a curved first glass panel and a curved liquid crystal panel is provided. In a preferred embodiment, the liquid crystal panel provided is a flexible substrate. The liquid crystal panel may have a liquid crystal layer.

In step 1715, the first curved glass panel and the curved liquid crystal panel may attach with a first adhesive. A first surface of the first curved glass panel may attach to a first surface of the curved liquid crystal panel by the first adhesive. The first adhesive may be a film adhesive or a liquid adhesive. Since the liquid crystal panel is flexible, the liquid crystal panel may fit to contours to the first surface of the first curved glass panel. In some embodiments, it is preferred that the liquid crystal panel fits into the contours of the first curved glass panel to prevent. When there is space between the first surface of the first curved glass panel and the first surface of the curved liquid crystal panel, an uneven pressure may form on the liquid crystal panel. Uneven pressure on the liquid crystal panel may cause performance issues on the LC assembly.

In step 1725, a second curved glass panel is provided. The second curved glass panel may have the same curve, or form, as the liquid crystal panel. In particular, a first surface of the second curved glass panel may have the same form or curve as a second surface of the liquid crystal panel after the liquid crystal panel has been attached to the first curved glass panel. The second curved glass panel may have small surface variations, such as variations of less than 200 microns.

In step 1735, the second curved glass panel is attached to the liquid crystal panel by a second adhesive. The first surface of the second glass panel is attached to the second surface of the liquid crystal panel. The second adhesive may be a liquid adhesive. The liquid crystal panel, when being attached to the second curved glass panel, is already attached to the first curved glass panel. Since it is attached to a glass panel, the liquid crystal panel may not have the flexibility it had prior to being attached. When mating the liquid crystal panel and the second curved glass panel, there may be small gaps between the two surfaces. The second adhesive, such as the liquid adhesive, may be used to fill in these gaps between the two panels. This may prevent and/or reduce pressure that may be felt on the liquid crystal panel.

EXAMPLES

Features described above with respect to the examples in FIGS. 1-12 can be combined in various ways. The following are specific examples which incorporate aspects of the previously described embodiments. Additional combinations of features and further modifications will be apparent to one of ordinary skill in the art in light of the disclosure.

Example No. 1

In certain aspects, a liquid crystal (LC) assembly comprises a liquid crystal layer, a first substrate and a second substrate located on opposite sides of the liquid crystal layer, and first outer layer. The liquid crystal layer includes TN liquid crystals. For example, in FIG. 9A, the liquid crystal 940 can include liquid crystals that have a twist angle in a default (voltage-off) state. The first substrate has a first conductive layer, e.g., ITO layer 916. Similarly, second substrate has a second conductive layer, e.g., ITO layer 920. Each of the first substrate and the second substrate comprises a flexible film. For example, as shown in FIG. 9A, layers 914 and 922 correspond to PC layers. The first outer layer includes a rigid, transparent material. For example, the first outer layer may correspond to glass layer 902.

Optionally, the TN liquid crystals have a twist angle less than or greater than 90 degrees. As discussed above, TN liquid crystal is not limited to a 90-degree twist angle and can encompass, for example, STN, MTN, and liquid crystals with a chiral dopant.

Optionally, the first outer layer has a three-dimensional curvature. For example, glass layer 902 may be curved to match the shape of a vehicle window. Thus, the first outer layer can be a vehicular window, for example a window of an automobile, airplane, or boat.

Optionally, the first outer layer can be an architectural window, for example, a glass door or building window.

Optionally, the LC assembly can include a second outer layer including a rigid, transparent material, where the second outer layer has a three-dimensional curvature (e.g., a curvature matching that of the first outer layer), and where the first substrate, the second substrate, and the liquid crystal layer are between the first outer layer and the second outer layer. For example, the second outer layer may correspond to glass layer 930.

The flexible film of the LC assembly can be formed of various flexible materials. For example, the flexible film of the first substrate or the second substrate can include PC, PET, or TAC.

Optionally, the LC assembly can include an infrared-blocking layer between the first substrate and the first outer layer, where the infrared-blocking layer includes polyethylene terephthalate (PET) or another material that operates as an infrared filter. For example, the infrared-block layer may correspond to PET layer 906.

Optionally, the first substrate and the first outer layer may be glued together with an adhesive. For example, as shown in FIGS. 9A-9C and the lamination process depicted in FIG. 10, a glass layer can be bonded to a surface of an LC cell, without or without intervening layers, and using PVB as the adhesive.

Optionally, the first substrate and the first outer layer are laminated with one or more intervening layers between the first substrate and the first outer layer. For example, in FIG. 9A the glass layer 902 and the PC layer 914 are separated by PET layer 906 and polarizer 910.

Optionally, the LC assembly can include a control unit (e.g., control unit 500 or 600) configured to generate control signals that establish a voltage across the first conductive layer and the second conductive layer, where a magnitude of the voltage determines an alignment of the TN liquid crystals in the liquid crystal layer. Additionally, the first outer layer can be a window (e.g., window 520), and the control unit may be attached to the window, as shown in FIGS. 5A and 5B. Further, as shown in FIGS. 5A and 5B, the LC assembly can include a cutout (e.g., cutout 512) shaped to accommodate the control unit such that the control unit is attached to the window without the LC assembly intervening. Additionally, the LC assembly can include an optional battery (e.g., battery 620) configured to supply power to the control unit, and an optional photovoltaic cell (e.g., photovoltaic cell 610) configured to recharge the battery using light from a light source that illuminates the LC assembly, where the battery and the photovoltaic cell are housed within the control unit.

Optionally, the first conductive layer and the second conductive layer can be etched to form patterns on surfaces of the first conductive layer and the second conductive layer. As described above in connection with FIG. 7B, the patterns can correspond to a plurality of regions that are individually dimmable to display graphics or text. For example, each region of the plurality of regions can include a first electrode corresponding to the first conductive layer and a second electrode corresponding to the second conductive layer, where the region is individually dimmable by establishing a voltage across the first electrode and the second electrode.

Example No. 2

In certain aspects, a method of enhancing a window (e.g., window 520 in FIG. 5A) involves attaching an LC assembly to the window, where the window is an automobile or building window, and where the LC assembly comprises a liquid crystal layer, a first substrate and a second substrate located on opposite sides of the liquid crystal layer, and first outer layer. The liquid crystal layer includes TN liquid crystals. The first substrate has a first conductive layer. Similarly, second substrate has a second conductive layer. Each of the first substrate and the second substrate comprises a flexible film. Attaching the LC assembly to the window can include placing the LC assembly against the window such that a surface of the first substrate substantially conforms to a surface of the window. For example, in FIG. 5B, if the window 520 had a three-dimensional curvature, placing LC assembly 510 against the window 520 may cause the LC assembly to conform the curvature of the window 520 if the LC assembly 510 includes a flexible film such as PC layer 914 in FIG. 9A.

Optionally, the flexible film of the first substrate or the second substrate can include PC, PET, or TAC.

Optionally, attaching the LC assembly to the window further can include applying an adhesive to at least one of the surfaces of the first substrate or the surface of the window prior to placing the LC assembly against the window. For example, the adhesive can be a transparent, water-based or solvent-based adhesive that forms a bond between the LC assembly and the window upon evaporation.

Optionally, the method can involve attaching a control unit to the window, where the control unit is configured to generate control signals that determine a light transmittance of the LC assembly by establishing a voltage established across the first conductive layer and the second conductive layer. The method can further involve connecting the control unit to the LC assembly using a cable configured to carry the control signals. The control unit can be attached to any location on the window. For example, method may involve placing the control unit on a corner of the window or the center of the window.

Example No. 3

In certain aspects, a method for laminating an LC assembly involves forming a stack including the following in order: a first rigid outer layer, a PVB layer, a first substrate having a first conductive layer, a liquid crystal layer, a second substrate having a second conductive layer, and a second rigid outer layer. For example, the stack may correspond to the LC assembly 1000 in FIG. 10. The method further involves, after forming the stack, heating the PVB layer until the PVB layer is at least partially melted, then cooling the PVB layer until the PVB layer is re-solidified.

Optionally, the liquid crystal layer includes twisted nematic liquid crystals, Guest-Host liquid crystals, or vertical alignment liquid crystals.

Optionally, at least one of the first substrate, the second substrate, or the outer layer includes polycarbonate.

Optionally, the stack further includes a polarizer comprising a polarization plate, a TAC coating, and a UV-blocking coating. As discussed above, LC assembly 1000 in FIG. 10 is a simplified representation of an LC assembly. The stack being laminated may therefore correspond to one of the previously described LC assemblies, such as the LC assembly 900 of FIG. 9A. Additionally, the method can involve forming a liquid crystal cell to contain liquid crystals in the liquid crystal layer, where the forming of the liquid crystal cell includes applying a sealant between the first substrate and the second substrate using a non-UV cured adhesive, and where the first substrate, the second substrate, and the sealant each define a boundary of the liquid crystal cell. For example, as discussed above, the adhesive 1102 in FIG. 11 is a UV adhesive but can be replaced with a two-part epoxy or other non-UV cured adhesive.

In addition to applying a sealant between the first substrate and the second substrate, the method can further involve placing a spacer between the first substrate and the second substrate, where the spacer is rectangular or cylindrical and defines a cell gap between the first substrate and the second substrate.

When applying the sealant between the first substrate and the second substrate, the first conductive layer or the second conductive layer can include ITO. For example, the first conductive layer and the second conductive layer may correspond to ITO layers 916 and 920, respectively. Accordingly, in some instances, the sealant can be applied to a surface of an ITO layer.

Optionally, the heating of the PVB layer can be performed at a temperature between 100 to 160° C. and with a pressure applied to the stack mechanically or through a vacuum environment. For example, the temperature can be set between 110 to 120° C. to heat the PVB layer. The pressure applied to the stack can be generated using a vacuum chamber or vacuum bag, in which case the method may involve setting the pressure between 1 to 4 bars. Alternatively, the pressure can be 10 to 15 bars of mechanically applied pressure.

Example No. 4

In certain aspects, an LC assembly comprises a stack including the following in order: a first rigid outer layer, a PVB layer, a first substrate comprising a first flexible film and having a first conductive layer, a liquid crystal layer comprising nematic liquid crystals and a chiral dopant, a second substrate comprising a second flexible film and having a second conductive layer, and a second rigid outer layer. The stack is a laminated stack formed as a result of heating the PVB layer until the PVB layer at least partially melted, followed by cooling the PVB layer until the PVB layer re-solidified, for example, according to the process described above with respect to FIG. 10.

Optionally, the liquid crystal layer includes Guest-Host liquid crystal.

Optionally, at least one of the first rigid outer layer or the second rigid outer layer includes polycarbonate.

Optionally, the stack further includes a polarizer comprising a polarization plate, a TAC coating, and a UV blocking coating. Additionally, the LC assembly can further include a liquid crystal cell containing the nematic liquid crystals in the liquid crystal layer, where the liquid crystal cell includes a sealant applied between the first substrate and the second substrate using a non-UV cured adhesive, and where the first substrate, the second substrate, and the sealant each define a boundary of the liquid crystal cell. Additionally, the LC assembly can include a spacer between the first substrate and the second substrate, where the spacer is rectangular or cylindrical and defines a cell gap between the first substrate and the second substrate. For example, the LC assembly can be formed according to the process described above with respect to FIG. 11. Optionally, the first conductive layer or the second conductive layer can include ITO and be located between the polarizer and the liquid crystal layer.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

Implementation examples are described in the following numbered clauses:

Clause 1: A liquid crystal (LC) assembly comprising: a first curved glass panel; a second curved glass panel; a liquid crystal panel having a first outer surface and a second outer surface; a layer of a liquid adhesive attaching the first curved glass panel and the first outer surface of the liquid crystal panel; and a film adhesive attaching the second curved glass panel and the second outer surface of the liquid crystal panel.

Clause 2: The LC assembly of clause 1, further comprising a sealing block, the sealing block surrounding an outer edge of the liquid crystal panel, the sealing block positioned between the first curved glass panel and the second curved glass panel.

Clause 3: The LC assembly of clause 2 further comprising a first sealing adhesive layer between a first surface of the sealing block and the first curved glass panel and a second sealing adhesive layer between a second surface of the sealing block and the second curved glass panel.

Clause 4: The LC assembly of any one of clauses 1-3 wherein the liquid crystal panel comprises a liquid crystal layer comprising a twisted nematic (TN) liquid crystal; a first substrate; and a second substrate, wherein the first substrate and the second substrate are positioned on opposite sides of the liquid crystal layer, wherein the first substrate and the second substrate each comprise a flexible film.

Clause 5: The LC assembly of any one of clauses 1-3 wherein the liquid crystal panel comprises a liquid crystal layer comprising a Guest-Host liquid crystal comprising liquid crystal particles and dye particles; a first substrate; and a second substrate, wherein the first substrate and the second substrate are positioned on opposite sides of the liquid crystal layer, wherein the first substrate and the second substrate each comprise a flexible film.

Clause 6: The LC assembly of any one of clauses 1-5 wherein the liquid crystal assembly is a vehicular window.

Clause 7: The LC assembly of clause 5 wherein the vehicular window is a window of an automobile.

Clause 8: The LC assembly of clauses 5 wherein the vehicular window is a window of an airplane or boat.

Clause 9: The LC assembly of any one of clauses 1-5 wherein the liquid crystal assembly is an architectural window.

Clause 10: An apparatus comprising: one or more edge covering strips and a liquid crystal assembly, the liquid crystal assembly comprising: a first glass panel; a liquid crystal panel; a second glass panel; and a sealing block, wherein a first surface of the first glass panel is attached to a first surface of the liquid crystal panel by a liquid adhesive, a second surface of the liquid crystal panel is attached to a first surface of the second glass panel by a film adhesive, the sealing block surrounding an outer edge of the liquid crystal panel, a first surface of the sealing block is attached to the first surface of the first glass panel by a first sealing adhesive layer, a second surface of the sealing block is attached to the first surface of the second glass panel by a second sealing adhesive layer, and the one or more edge covering strips are on an outer edge region of the liquid crystal assembly.

Clause 11: The apparatus of clause 10 wherein a first edge covering strip is between the first surface of the first glass panel and the first surface of the sealing block.

Clause 12: The apparatus of clause 11 wherein the first edge covering strip extends from the outer edge of the liquid crystal assembly and extends over the sealing block.

Clause 13: The apparatus of clause 11 wherein the first edge covering strip extends from an edge of the liquid crystal assembly, over the sealing block, and over part of the liquid crystal panel.

Clause 14: The apparatus of any one of clauses 10-13 wherein the first edge covering strip has a width of 5-11 mm.

Clause 15: The apparatus of any one of clauses 10-13 wherein the first edge covering strip has a width of 7-9 mm.

Clause 16: The apparatus of any one of clauses 10-15 wherein a second edge covering strip is on a second surface of the second glass panel.

Clause 17: The apparatus of any one of clauses 10-16 wherein the one or more edge covering strips are black.

Clause 18: The apparatus of any one of clauses 10-16 wherein the one or more edge covering strips are a silver color.

Clause 19: The apparatus of any one of clauses 10-16 wherein the one or more edge covering strips have an optical reflection.

Clause 20: The apparatus of claim 10 wherein a first edge covering strip is on a second surface of the first glass panel and a second edge covering strip is on a second surface of the second glass panel.

Clause 21: The apparatus of any one of clauses 10-20 wherein the first glass panel, the liquid crystal panel, and the second glass panel are flat.

Clause 22: The apparatus of any one of clauses 10-20 wherein the first glass panel, the liquid crystal panel, and the second glass panel are curved.

What is claimed is:

1. A liquid crystal (LC) assembly comprising:
   a first curved glass panel;
   a second curved glass panel;
   a liquid crystal panel having a first outer surface and a second outer surface;
   a liquid adhesive attaching the first curved glass panel and the first outer surface of the liquid crystal panel; and
   a film adhesive attaching the second curved glass panel and the second outer surface of the liquid crystal panel;
   wherein the LC assembly further comprises a sealing block, the sealing block surrounds an outer edge of the liquid crystal panel, the sealing block is positioned between the first curved glass panel and the second curved glass panel;
   wherein the liquid adhesive attaching the first curved glass panel and the first outer surface of the liquid crystal panel is further curved to cover on a side surface of the liquid crystal panel, the side surface is disposed between the first outer surface and the second outer surface, and the sealing block is attached to the side surface by a part of the liquid adhesive covering on the side surface.

2. The LC assembly of claim 1, further comprising a first sealing adhesive layer between a first surface of the sealing block and the first curved glass panel and a second sealing adhesive layer between a second surface of the sealing block and the second curved glass panel.

3. The LC assembly of claim 1, wherein the liquid crystal panel comprises a liquid crystal layer comprising a twisted nematic (TN) liquid crystal; a first substrate; and a second substrate, wherein the first substrate and the second substrate are positioned on opposite sides of the liquid crystal layer, wherein the first substrate and the second substrate each comprise a flexible film.

4. The LC assembly of claim 1, wherein the liquid crystal panel comprises a liquid crystal layer comprising a Guest-Host liquid crystal comprising liquid crystal particles and dye particles; a first substrate; and a second substrate, wherein the first substrate and the second substrate are positioned on opposite sides of the liquid crystal layer, wherein the first substrate and the second substrate each comprise a flexible film.

5. The LC assembly of claim 1, wherein the liquid crystal assembly is a vehicular window.

6. The LC assembly of claim 5, wherein the vehicular window is a window of an automobile.

7. The LC assembly of claim 5, wherein the vehicular window is a window of an airplane or boat.

8. The LC assembly of claim 1, wherein the liquid crystal assembly is an architectural window.

9. An apparatus comprising:
   one or more edge covering strips and a liquid crystal assembly, the liquid crystal assembly comprising:
   a first glass panel;
   a liquid crystal panel;
   a second glass panel; and
   a sealing block, wherein
   a first surface of the first glass panel is attached to a first surface of the liquid crystal panel by a liquid adhesive,
   a second surface of the liquid crystal panel is attached to a first surface of the second glass panel by a film adhesive,
   the sealing block surrounds an outer edge of the liquid crystal panel, a first surface of the sealing block is attached to the first surface of the first glass panel by a first sealing adhesive layer, a second surface of the sealing block is attached to the first surface of the second glass panel by a second sealing adhesive layer,
   the liquid adhesive attaching the first surface of the first glass panel and the first surface of the liquid crystal panel is further curved to cover on a side surface of the liquid crystal panel, the side surface of the liquid crystal panel is disposed between the first surface of the first glass panel and the second surface of the first glass panel, and the sealing block is attached to the side surface of the liquid crystal panel by a part of the liquid adhesive covering on the side surface, and
   the one or more edge covering strips are on an outer edge region of the liquid crystal assembly.

10. The apparatus of claim 9 wherein a first edge covering strip is between the first surface of the first glass panel and the first surface of the sealing block.

11. The apparatus of claim 10 wherein the first edge covering strip extends from the outer edge of the liquid crystal assembly and extends over the sealing block.

12. The apparatus of claim 10 wherein the first edge covering strip extends from an edge of the liquid crystal assembly, over the sealing block, and over part of the liquid crystal panel.

13. The apparatus of claim 10 wherein the first edge covering strip has a width of 5-11 mm.

14. The apparatus of claim 10 wherein the first edge covering strip has a width of 7-9 mm.

15. The apparatus of claim 10 wherein a second edge covering strip is on a second surface of the second glass panel.

16. The apparatus of claim 9 wherein the one or more edge covering strips are black.

17. The apparatus of claim 9 wherein the one or more edge covering strips are a silver color.

18. The apparatus of claim 9 wherein the one or more edge covering strips have an optical reflection.

19. The apparatus of claim 9 wherein a first edge covering strip is on a second surface of the first glass panel and a second edge covering strip is on a second surface of the second glass panel.

20. The apparatus of claim 9 wherein the first glass panel, the liquid crystal panel, and the second glass panel are flat.

21. The apparatus of claim 9 wherein the first glass panel, the liquid crystal panel, and the second glass panel are curved.

\* \* \* \* \*